(12) United States Patent
Whelan et al.

(10) Patent No.: US 8,833,346 B2
(45) Date of Patent: Sep. 16, 2014

(54) APPARATUS AND METHODS FOR MOUNTING FUEL DELIVERY SYSTEM COMPONENTS TO FUEL TANKS

(75) Inventors: Sean Whelan, Lansing, MI (US); Robert Tate, South Haven, MI (US); Brian Scott, Cornstock Park, MI (US)

(73) Assignee: Brunswick Corporation, Lake Forrest, IL (US)

( * ) Notice: Subject to any disclaimer, the term of this patent is extended or adjusted under 35 U.S.C. 154(b) by 604 days.

(21) Appl. No.: 12/793,009

(22) Filed: Jun. 3, 2010

(65) Prior Publication Data

US 2011/0084073 A1 Apr. 14, 2011

Related U.S. Application Data

(60) Provisional application No. 61/250,357, filed on Oct. 9, 2009.

(51) Int. Cl.
*B65D 41/04* (2006.01)
*F02M 37/00* (2006.01)

(52) U.S. Cl.
CPC ................... *F02M 37/0076* (2013.01)
USPC .......................... 123/516; 220/562

(58) Field of Classification Search
CPC ...... B60K 15/00; B60K 15/03; B60K 15/035; B60K 15/063; B60K 15/067; B60K 15/07; B60K 15/073
USPC .................. 123/519, 518, 516, 698; 220/562
See application file for complete search history.

(56) References Cited

U.S. PATENT DOCUMENTS

| | | | |
|---|---|---|---|
| 3,974,936 A | | 8/1976 | Gerdes |
| 4,337,873 A | | 7/1982 | Johnson |
| 4,401,309 A | * | 8/1983 | Matsuzaki et al. ............ 280/835 |
| 4,651,701 A | | 3/1987 | Weaver |
| 4,741,715 A | | 5/1988 | Hedge |
| 4,799,569 A | * | 1/1989 | Hattori et al. ................. 180/219 |
| 4,869,225 A | * | 9/1989 | Nagata et al. ................. 123/509 |
| 4,887,733 A | | 12/1989 | Harris |
| 5,218,942 A | | 6/1993 | Coha et al. |
| 5,231,967 A | * | 8/1993 | Baltz et al. .................... 123/497 |
| 5,322,099 A | | 6/1994 | Langlois |
| 5,361,906 A | * | 11/1994 | Sterett .......................... 206/509 |
| 5,408,977 A | * | 4/1995 | Cotton ......................... 123/520 |
| 5,515,891 A | | 5/1996 | Langlois |
| 5,551,405 A | * | 9/1996 | Thompson .................... 123/516 |
| 5,579,740 A | | 12/1996 | Cotton et al. |

(Continued)

OTHER PUBLICATIONS

United States Patent and Trademark Office, "Non-Final Office Action," issued in connection with U.S. Appl. No. 12/793,005, mailed Jul. 23, 2012, 27 pages.

(Continued)

*Primary Examiner* — Steven A. Reynolds
*Assistant Examiner* — King M Chu
(74) *Attorney, Agent, or Firm* — Hanley, Flight & Zimmerman, LLC.

(57) ABSTRACT

Apparatus and methods for mounting fuel delivery system components to fuel tanks are described herein. An example fuel tank includes a housing having a cavity to store a liquid fuel and a boss integrally formed with and protruding from a surface of the housing to receive a fuel delivery system component. The boss receives a threaded fastener to couple the fuel delivery system component to the surface of the fuel tank.

18 Claims, 15 Drawing Sheets

(56) References Cited

U.S. PATENT DOCUMENTS

| | | | |
|---|---|---|---|
| 5,634,706 A * | 6/1997 | Barry | 362/473 |
| 5,722,559 A * | 3/1998 | Branham | 220/562 |
| 5,727,603 A | 3/1998 | Langlois | |
| 5,794,805 A * | 8/1998 | Branham | 220/86.2 |
| 5,809,975 A * | 9/1998 | Tuckey et al. | 123/509 |
| 5,829,491 A * | 11/1998 | Bennett | 141/59 |
| 5,901,689 A | 5/1999 | Kimura et al. | |
| 5,950,688 A | 9/1999 | Langlois | |
| 5,996,607 A * | 12/1999 | Bergsma et al. | 137/202 |
| 6,176,259 B1 | 1/2001 | Harde et al. | |
| 6,182,693 B1 | 2/2001 | Stack et al. | |
| 6,298,540 B1 * | 10/2001 | Benjey et al. | 29/452 |
| 6,360,765 B1 | 3/2002 | Pozgainer | |
| 6,364,145 B1 | 4/2002 | Shaw et al. | |
| 6,367,650 B1 | 4/2002 | Kuehnemund et al. | |
| 6,553,973 B1 | 4/2003 | Coha et al. | |
| 6,591,866 B2 | 7/2003 | Distelhoff et al. | |
| 6,595,814 B2 * | 7/2003 | Hartke et al. | 440/88 F |
| 6,644,289 B2 | 11/2003 | Noda | |
| 6,698,401 B2 | 3/2004 | Suzuki et al. | |
| 6,712,234 B2 | 3/2004 | Boecker | |
| 6,840,264 B1 | 1/2005 | Bhavsar et al. | |
| 6,863,082 B1 * | 3/2005 | McIntosh et al. | 137/202 |
| 6,866,029 B1 * | 3/2005 | Clarkson et al. | 123/509 |
| 6,889,546 B2 | 5/2005 | Shost et al. | |
| 6,892,711 B2 | 5/2005 | Belanger, Jr. et al. | |
| 6,896,293 B2 * | 5/2005 | Philipps et al. | 280/833 |
| 6,928,989 B2 | 8/2005 | Powell | |
| 7,047,948 B2 | 5/2006 | Gerhardt et al. | |
| 7,143,750 B2 * | 12/2006 | Brunel et al. | 123/509 |
| 7,159,573 B2 | 1/2007 | Okada | |
| 7,159,577 B2 | 1/2007 | Haskew et al. | |
| 7,225,795 B2 * | 6/2007 | Mills | 123/516 |
| 7,225,798 B2 * | 6/2007 | Wang et al. | 123/518 |
| 7,225,799 B2 * | 6/2007 | Wang et al. | 123/518 |
| 7,228,847 B2 | 6/2007 | Burke et al. | |
| 7,228,850 B2 * | 6/2007 | King | 123/519 |
| 7,234,452 B2 * | 6/2007 | Mills | 123/516 |
| 7,249,594 B2 | 7/2007 | Hashiguchi | |
| 7,249,595 B2 | 7/2007 | Mills et al. | |
| 7,255,094 B2 * | 8/2007 | King | 123/519 |
| 7,275,556 B2 | 10/2007 | Frohwein | |
| 7,281,525 B2 * | 10/2007 | Shears et al. | 123/518 |
| 7,360,565 B2 | 4/2008 | Peterson et al. | |
| 7,438,059 B2 * | 10/2008 | Mills et al. | 123/519 |
| 7,530,348 B2 * | 5/2009 | Wang et al. | 123/518 |
| 2002/0125254 A1 | 9/2002 | Hagano et al. | |
| 2003/0015536 A1 * | 1/2003 | Tekulve et al. | 220/562 |
| 2003/0057212 A1 | 3/2003 | Fish et al. | |
| 2004/0079150 A1 * | 4/2004 | Breed et al. | 73/291 |
| 2004/0140257 A1 | 7/2004 | Dockery et al. | |
| 2005/0127078 A1 | 6/2005 | Vorenkamp et al. | |
| 2005/0178368 A1 * | 8/2005 | Donahue et al. | 123/520 |
| 2005/0189357 A1 | 9/2005 | Moizumi | |
| 2005/0199294 A1 | 9/2005 | Vaitses | |
| 2005/0284450 A1 * | 12/2005 | Mills | 123/519 |
| 2006/0011173 A1 | 1/2006 | Davis et al. | |
| 2006/0032663 A1 | 2/2006 | Hosoya | |
| 2006/0065252 A1 * | 3/2006 | Meiller et al. | 123/519 |
| 2006/0151505 A1 * | 7/2006 | Kobayashi | 220/562 |
| 2008/0145582 A1 | 6/2008 | Spence et al. | |
| 2009/0139495 A1 * | 6/2009 | Crawford | 123/519 |
| 2009/0166364 A1 * | 7/2009 | Shimomura | 220/562 |

OTHER PUBLICATIONS

United States Patent and Trademark Office, "Final Office Action" issued in connection with U.S. Appl. No. 12/793,001, mailed Jan. 9, 2013, 20 pages.

United States Patent and Trademark Office, "Non-Final Office Action" issued in connection with U.S. Appl. No. 12/793,003, mailed Jan. 29, 2013, 33 pages.

United States Patent and Trademark Office, "Non-Final Office Action," issued in connection with U.S. Appl. No. 12/793,001, mailed Apr. 12, 2012, 16 pages.

United States Patent and Trademark Office, "Restriction Requirement," issued in connection with U.S. Appl. No. 12/793,005, mailed Apr. 13, 2012, 9 pages.

United States Patent and Trademark Office, "Final Office Action," issued in connection with U.S. Appl. No. 12/793,005, mailed Jan. 7, 2013, 20 pages.

* cited by examiner

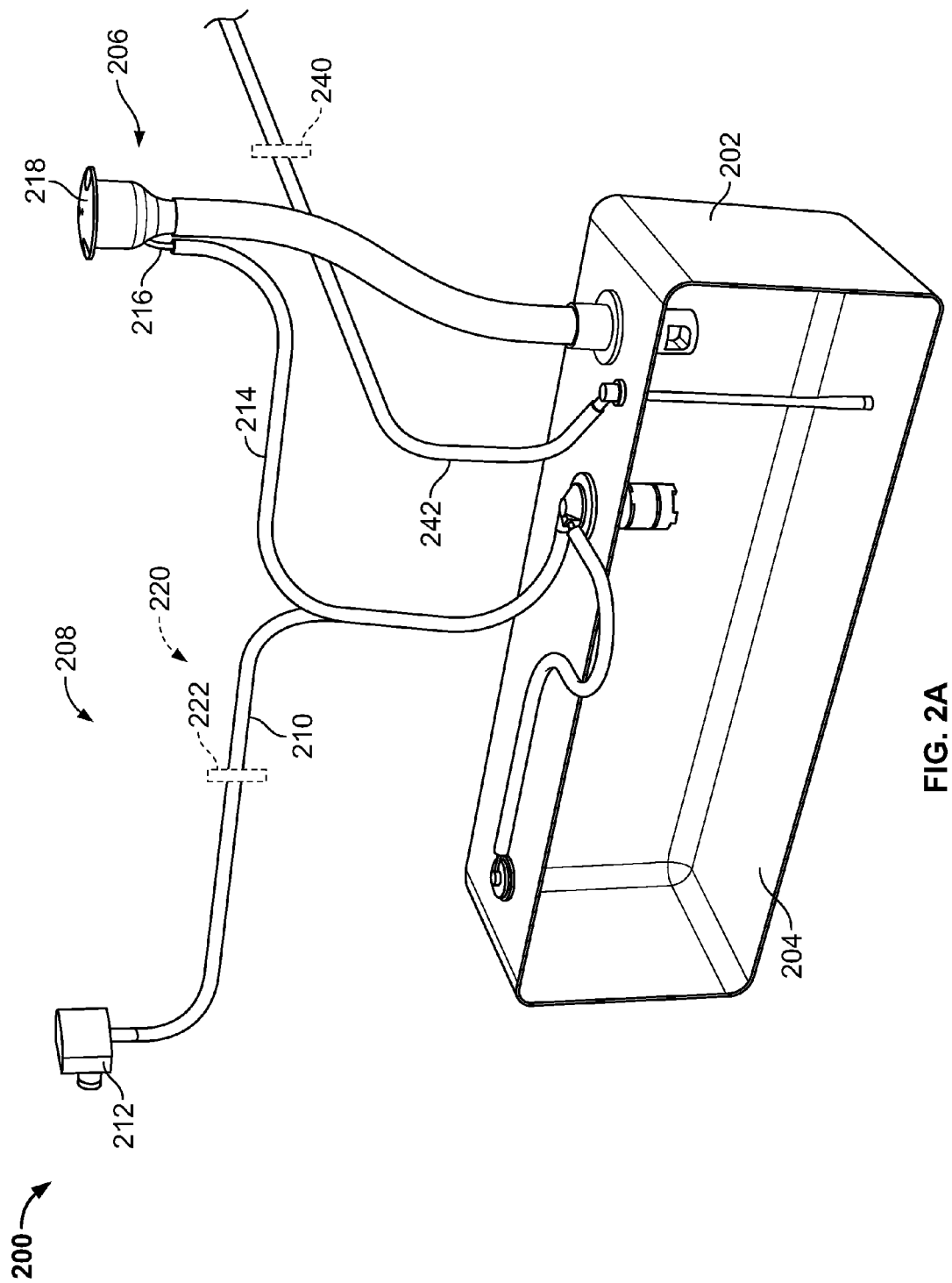

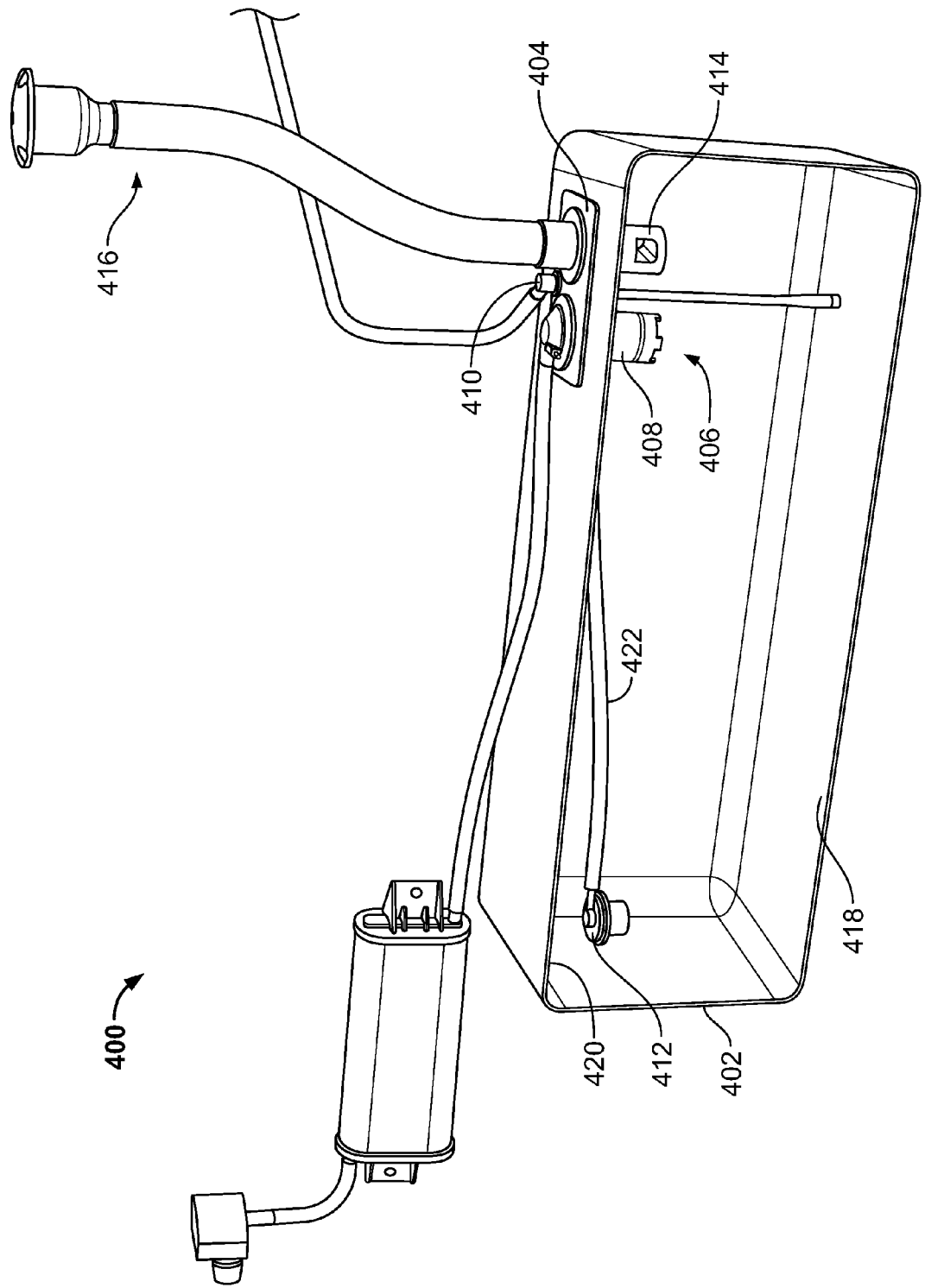

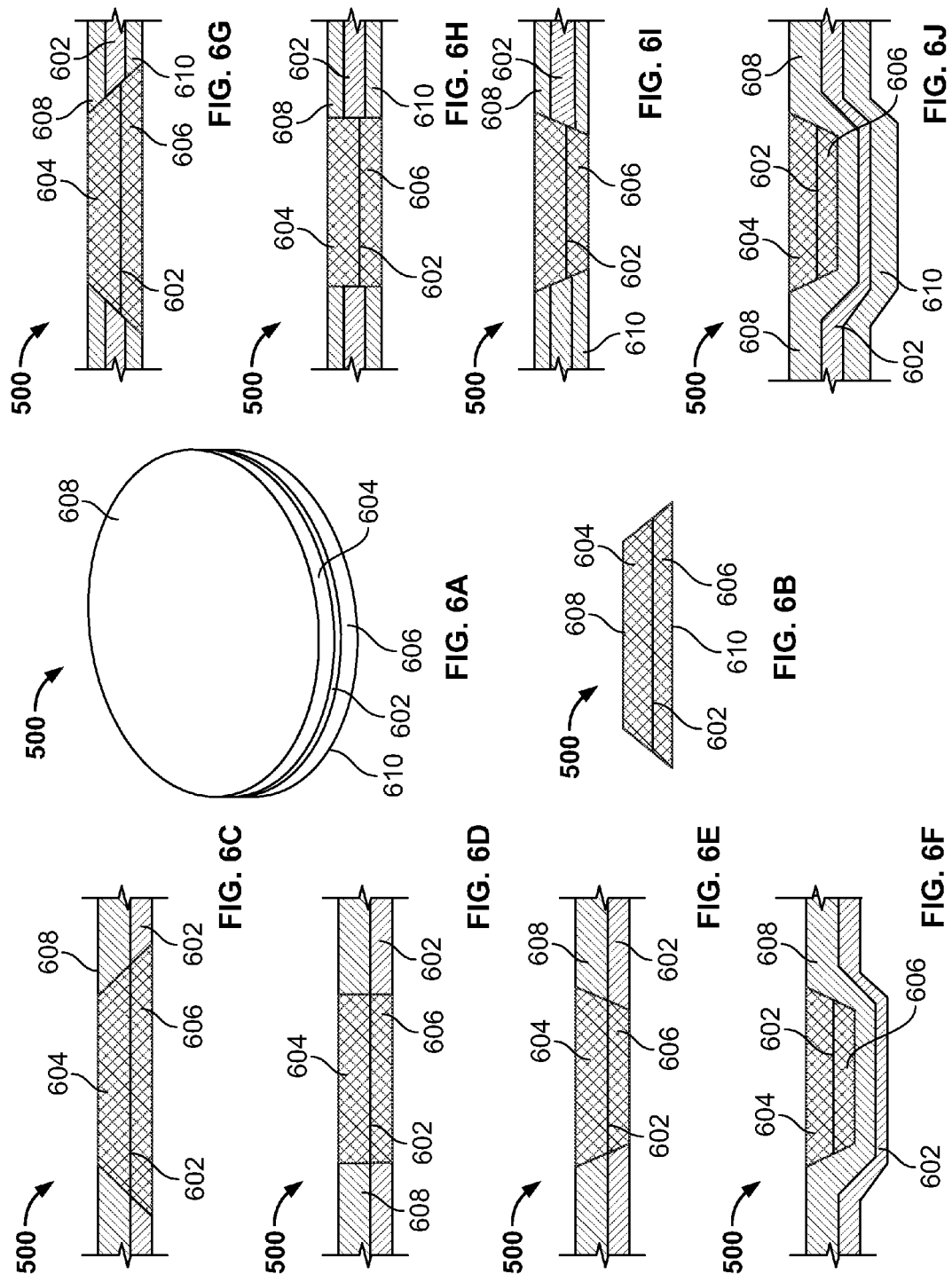

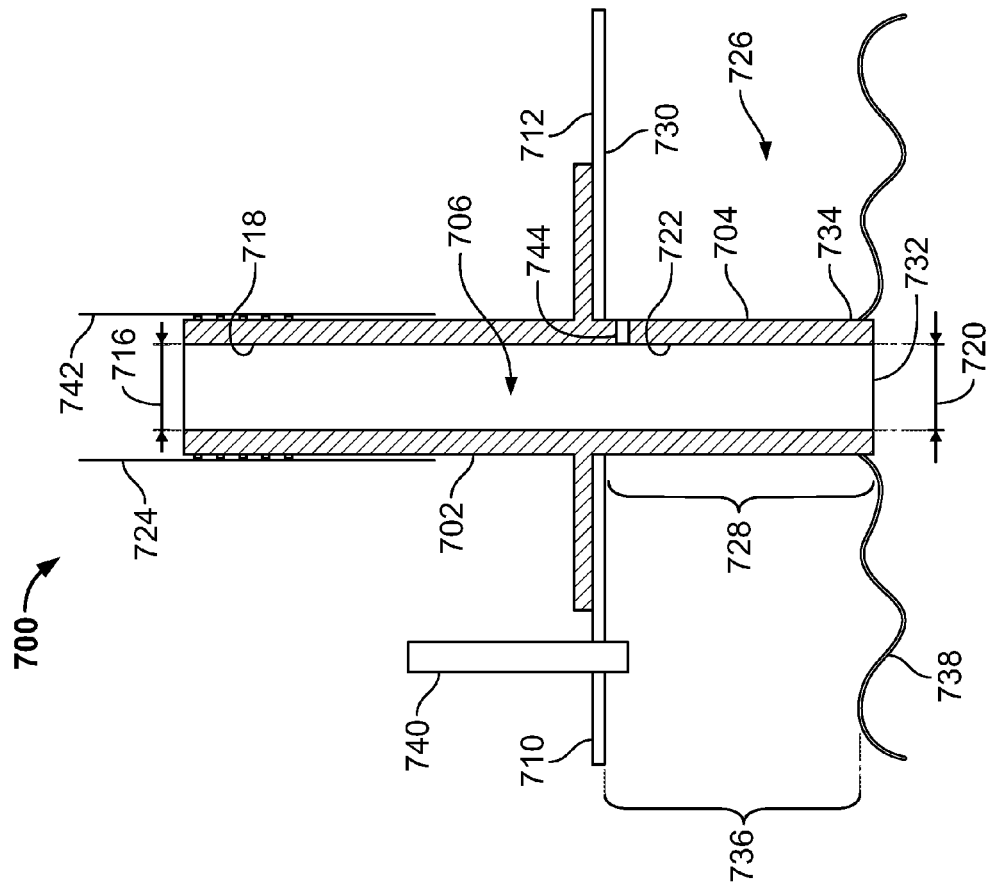
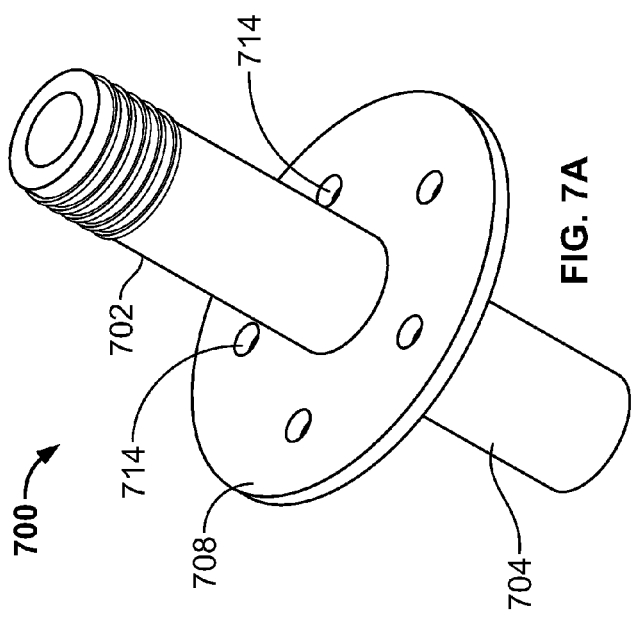
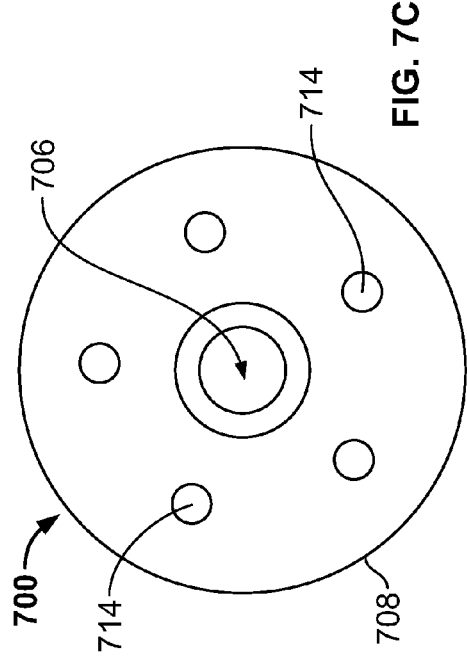
FIG. 7B
FIG. 7A
FIG. 7C

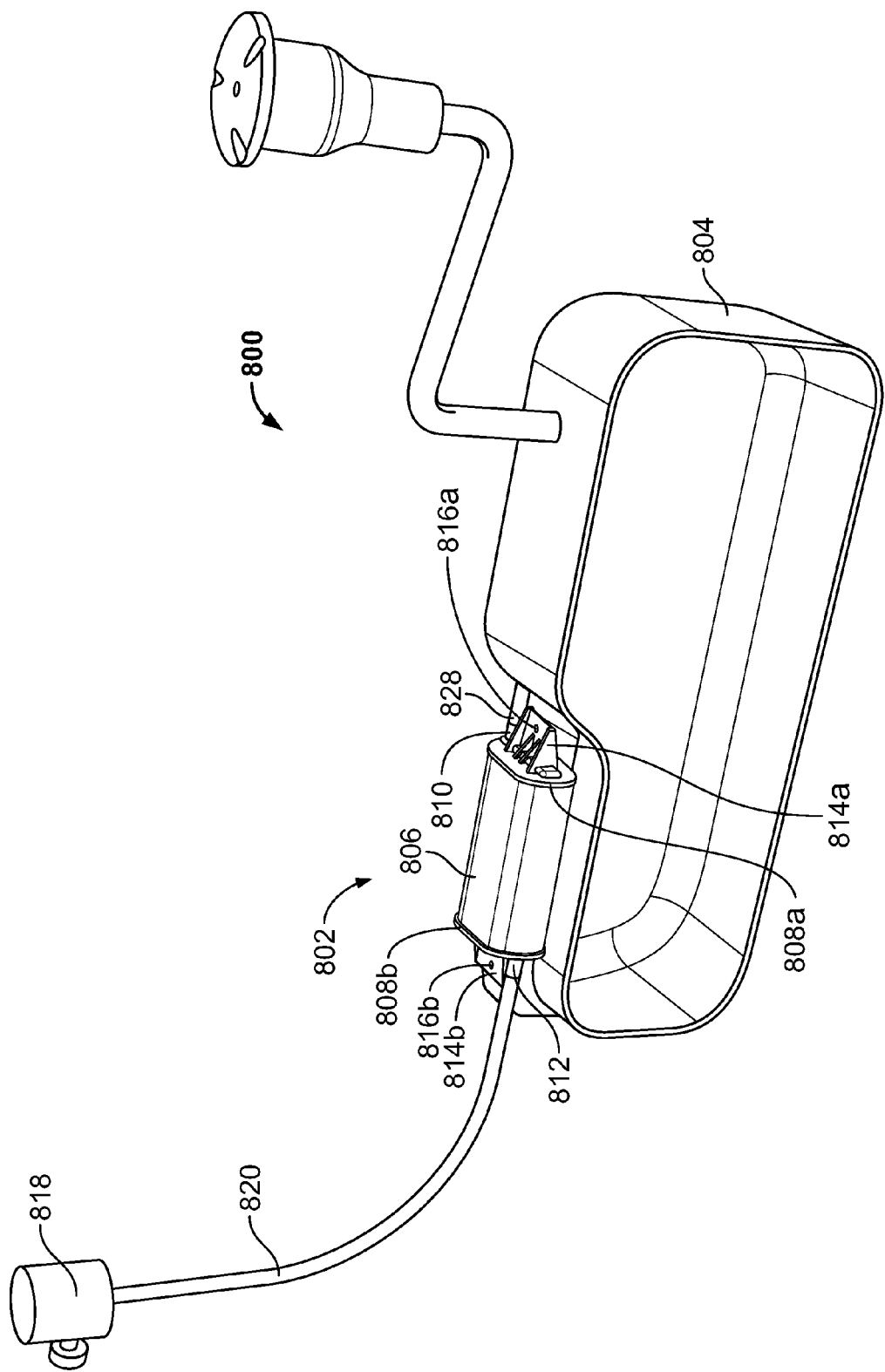

APPARATUS AND METHODS FOR MOUNTING FUEL DELIVERY SYSTEM COMPONENTS TO FUEL TANKS

CROSS REFERENCE TO RELATED APPLICATION

This patent claims the benefit of U.S. Provisional Patent Application Ser. No. 61/250,357, filed Oct. 9, 2009, entitled FUEL DELIVERY SYSTEMS HAVING IMPROVED EVAPORATIVE EMISSION CONTROLS, which is incorporated herein by reference in its entirety.

FIELD OF THE DISCLOSURE

The present disclosure relates generally to fuel delivery systems and, more particularly, to apparatus and methods for mounting fuel delivery system components to fuel tanks.

BACKGROUND

Governmental agencies (e.g., the Environmental Protection Agency) have enacted regulations to limit the amount of evaporative emissions emitted by boats and other marine crafts during operation and/or non-operation of the marine vehicle. More specifically, government regulations (e.g., title 40 of the Code of Federal Regulations) have been enacted toward controlling diurnal evaporative emissions of marine vehicles. In particular, these regulations limit the amount of evaporative diurnal emissions that a marine vehicle may permissibly emit during a diurnal cycle (e.g., periods of non-operation).

During non-operation of the marine vehicle, for example, a fuel delivery system of a marine vehicle may be subjected to daily ambient temperature changes that may cause the release of hydrocarbons to the environment. Such emissions are commonly referred to as diurnal emissions and are considered hazardous to the environment. Often, fuel or vapor leakage is exacerbated by diurnal temperature cycles. Diurnal emissions are evaporative emissions that are released due to the daily cycle of liquid fuel becoming fuel vapor during the daylight hours and condensing during the night. More specifically, during a diurnal cycle, the temperature of the air decreases during the night hours, causing the pressure of the fuel and/or fuel vapors in the fuel tank to decrease. When the pressure decreases, air is drawn into the fuel tank, which mixes with the fuel vapors. During the daylight hours, the temperature of the air may increase causing the pressure of the fuel and/or vapors in the fuel tank to increase. Such an increase in pressure causes fuel leakage or emission of fuel vapors via the fuel delivery system (e.g., a vent). For example, fuel leakage or emission of vapors may occur through a venting system of the fuel system and/or via permeation through various couplings (e.g., valves) of the fuel delivery system components.

BRIEF DESCRIPTION OF THE DRAWINGS

FIGS. 2A-2B illustrate an example fuel delivery systems described herein.

FIGS. 4A-4B illustrate another example fuel delivery system described herein.

FIGS. 6A-6J illustrate an example insert material that may be used to implement to the example fuel delivery system of FIG. 5.

FIGS. 7A-7C illustrate an example fluid coupling that may be used to implement a fuel delivery system.

FIGS. 8A-8C illustrate yet another example fuel delivery system described herein.

DETAILED DESCRIPTION

In general, the example fuel delivery systems described herein may be used with marine crafts or vehicles. The example fuel delivery systems described herein include enhanced or improved evaporative emission apparatus to control or substantially reduce diurnal emissions. For example, the fuel delivery systems described herein may be configured to substantially reduce or prevent diurnal emissions through a venting system of the fuel delivery system when the pressure of the fuel within a fuel reservoir is below a predetermined pressure (e.g., 5 psi). In yet another example, the fuel delivery systems described herein substantially reduce or prevent diurnal emissions through various couplings (e.g., valves) of the fuel system components.

In some examples, the example fuel delivery systems described herein may be implemented with insert materials having low permeation characteristics or rates to substantially reduce permeation of emissions via various couplings (e.g., via one or more valve couplings) coupled to a fuel reservoir of the fuel delivery system. Additionally or alternatively, the fuel delivery system may include a fluid coupling to gauge the amount of liquid fuel in the fuel tank during a filling event and/or to prevent fuel spillage during a filling event or operation.

As used herein, a "fluid" includes, but is not limited to, a liquid such as fuel (e.g., gasoline), a vapor such as fuel vapor (e.g., gasoline vapor), a gas (e.g., air) and/or any combination or mixture thereof.

Figure 1:
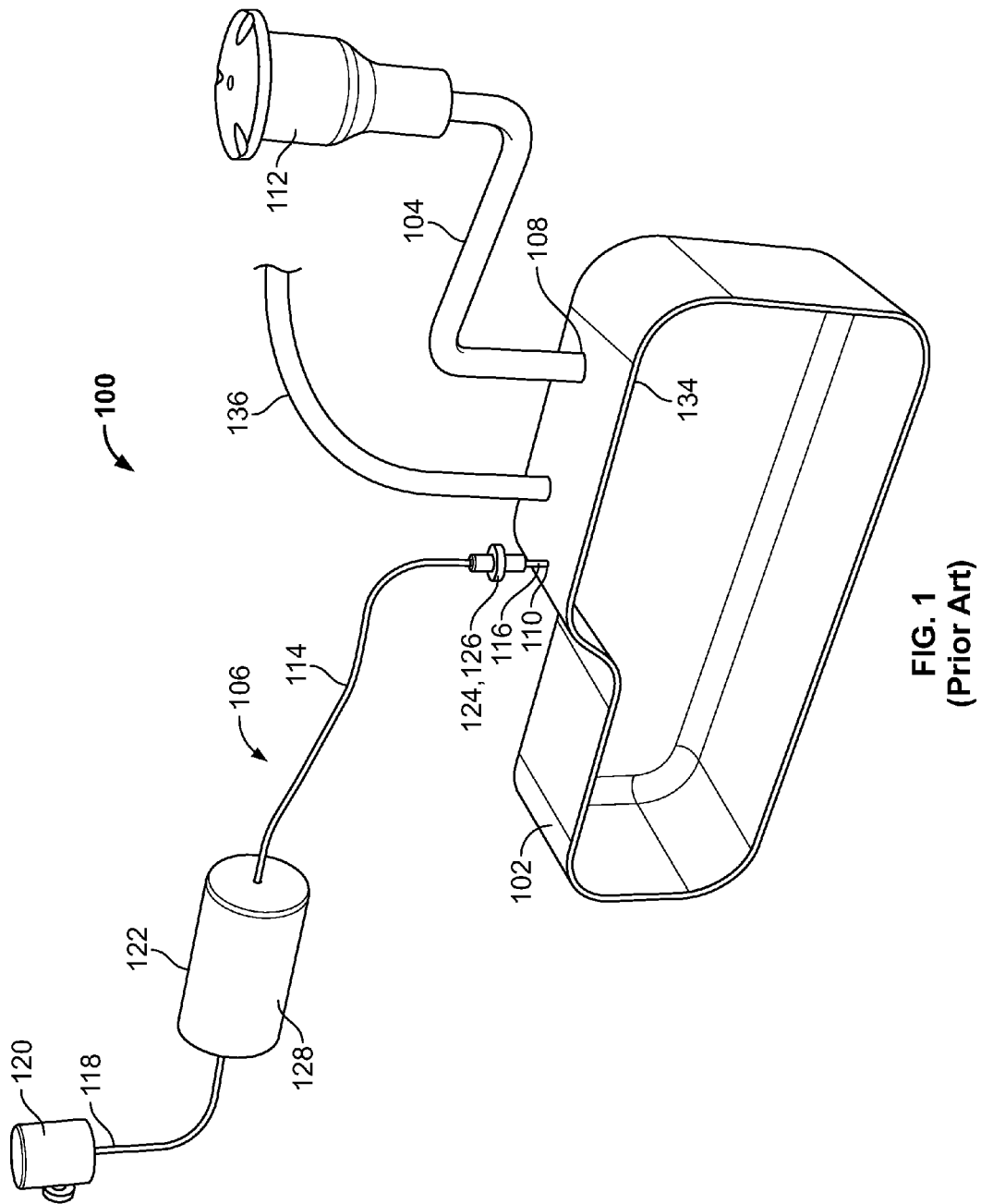
FIG. 1 is schematic representation of a known example fuel tank system.

FIG. 1 illustrates a known marine fuel delivery system 100 having known evaporative emission controls. The example fuel delivery system 100 includes a fuel tank 102 for storing fuel (e.g., gasoline, diesel fuel, etc.), a filler tube 104, and a venting system 106 to vent the fuel tank 102. The filler tube 104 is coupled to the fuel tank 102 at a first port or coupling 108 and the venting system 106 is coupled to the fuel tank 102 at a second port or coupling 110. The filler tube 104 may include a deckfill 112 that is adapted for mounting to a deck of a marine craft such as, for example, a deck of a boat, and which has an opening for receiving a nozzle such as, for example, a nozzle of a fuel pump, etc.

In the example venting system 106, a tubular vent line 114 is coupled to the second port 110 of the fuel tank 102 at a first end 116 and vents to, for example, the atmosphere at a second end 118. The venting system 106 equalizes the pressure in the fuel tank 102 to accommodate volumetric changes (e.g., expansion) in the fuel tank 102. For example, when the pressure of fuel and/or vapors in the fuel tank 102 increases, fuel vapors are released from the fuel tank 102 through the tubular vent line 114. In other words, an increase in pressure in the fuel tank 102 causes fuel vapors (e.g., containing hydrocarbons) in the fuel tank 102 to vent or release to the atmosphere via the vent line 114.

Additionally, during non-operation of the marine vehicle, the fuel delivery system 100 may be subjected to daily ambient temperature changes that may cause or affect the pressure of the fuel and/or fuel vapors within the fuel delivery system 100 (e.g., during diurnal temperature cycles). For example, an increase in fuel tank pressure may cause the release of hydrocarbons or gasoline to the environment. Diurnal emissions are evaporative emissions that are released due to daily temperature changes or cycles that may cause liquid fuel to become fuel vapor during the daylight hours and condensing fuel vapors to liquid during the night hours. As a result, the pressure cycling that occurs in response to these temperature changes causes the release of hydrocarbons from the fuel tank 102 to the environment via the vent line 114.

Thus, the venting system 106 can continuously vent and/or emit emissions to the environment. Such a configuration may not be in compliance with certain governmental standards. For example, to be in compliance with governmental regulations enacted by the EPA, either the fuel tank 102 must be sealed according to certain standards (e.g., to prevent diurnal emissions when the pressure within the fuel tank 102 is below a predetermined value) or the fuel delivery system 100 must be provided with a vapor collection apparatus.

To help reduce venting liquid fuel, emissions, fuel vapors and/or pollutants to the environment, the venting system 106 may include various evaporative emission control components such as, for example, a vent apparatus 120, a vapor collection apparatus 122, and/or a surge protector 124 or a liquid-vapor separator 126, which are coupled in fluid communication with the vent line 114.

For example, the vapor collection apparatus 122 may be provided to passively filter emissions (e.g., hydrocarbons) from the fuel vapors venting to the atmosphere via the vent line 114. The vapor collection apparatus 122 comprises a canister 128 having an emission(s)-capturing or filter material (e.g., an adsorbent material) such as, for example, activated carbon, charcoal, etc., that collects and stores evaporative emissions such as, for example, hydrocarbons to reduce pollution to the environment. The stored emissions captured and stored by the canister 128 are returned or carried to the fuel tank 102 as air flows through the canister 128 when the air is drawn from the atmosphere to the fuel tank 102 via the vent line 114. However, the vapor collection apparatus 122 can be relatively expensive.

Additionally, the vapor collection apparatus 122 increases the overall dimensional footprint of the fuel delivery system 100 and/or is typically mounted at a remote location from the fuel tank 102 due to space limitations of the marine vehicle. Such a configuration requires additional or longer length tubing (e.g., a longer length vent line 114), which may increase fuel leakage to the environment via the tubing and/or tubing couplings.

Additionally or alternatively, the fuel tank 102 lacks a liquid fuel level apparatus to determine the level of the fuel in the fuel tank 102. As a result, the fuel tank 102 may be overfilled beyond a recommended amount. For example, regulations or a manufacturer recommendation may require a certain percentage of a vapor dome or ullage (e.g., a 5% ullage) when filling the fuel tank to allow for fuel expansion. However, when filling the fuel tank 102, the example fuel delivery system 100 lacks an indicator to determine the liquid fuel level in the fuel tank 102 during the filling event or operation.

Additionally or alternatively, during a filling operation, as the fuel tank 102 is being filled via the deck fill 112, the level of fuel stored in the fuel tank 102 rises. The fuel vapors in the fuel tank 102 are displaced and vented from the fuel tank 102 via the vent line 114. Additionally, such displacement of the fuel vapors from the fuel tank 102 may cause the fuel vapors to carry liquid fuel through the vent line 114 and out to the environment through the vent apparatus 120.

Thus, fuel leakage or overflow may occur via the filler line 104 and/or the vent line 114 during a filling operation. Such overflow can occur during filling when using a manually operated nozzle and/or an automatic nozzle when an automated shut-off is not activated. Such overflow typically occurs as the liquid level in the fuel tank approaches an upper, interior surface 134 of the fuel tank 102 (e.g., when the fuel tank is substantially full). As the liquid is filling in the fuel tank 102, the liquid fuel is displacing the air and/or fuel vapors in the fuel tank 102 to the environment via for example the vent 120 and/or the filler tube 104. As a result, the air and/or fuel vapors carry liquid fuel from the fuel tank 102 to, for example, the deck of the marine craft via the fuel fill tube 104 and/or the vent 120, causing liquid fuel spillage.

Additionally or alternatively, diurnal emissions may occur via a fuel line 136 of the known fuel delivery system 100. When the pressure in the fuel tank 102 increases during a diurnal cycle, the fuel vapors may fill the fuel line 136. The fuel vapors may leak to the environment via permeation, couplings coupled to the fuel line 136 and/or the engine.

FIG. 2A illustrates an example marine fuel delivery system 200 described herein having improved evaporative emission controls. More specifically, the example fuel delivery system 200 described herein includes evaporative emission controls to meet or satisfy governmental diurnal emissions regulations (e.g., EPA regulations). The example fuel delivery system 200 of FIG. 2A includes a fuel tank 202 that is to be permanently mounted to a marine vehicle. However, in other examples, the fuel tank 202 may be a portable fuel tank (i.e., non-permanently mounted). The fuel tank 202 has a cavity or reservoir 204 to receive liquid fuel via a fuel fill or deckfill apparatus 206.

As shown in FIG. 2A, the fuel delivery system 200 includes a venting system 208 fluidly coupled to the fuel tank 202 and the fuel fill apparatus 206. The venting system 208 includes a first vent tube 210 to fluidly couple the fuel tank 202 to a vent or P-trap 212 and a second vent tube 214 to fluidly couple the fuel tank 202 to a vent 216 of the fuel fill apparatus 206. The fuel fill apparatus 206 includes a fuel cap assembly 218 that removably couples from the fuel fill apparatus 206 to enable filling of the fuel tank 202 with liquid fuel. As described in greater detail below in connection with FIGS. 3A-3C, the fuel cap assembly 218 includes a pressure relief system (not shown) that is in fluid communication with the venting system 208 and the fuel tank 202. Additionally or alternatively, in some examples, the vent 212 may also include a pressure relief system such as, for example, a pressure relief valve, a pressure relief system similar to the pressure relief system of FIGS. 3A-3C, and/or any other type of pressure relief apparatus.

In yet other examples, an example venting system 220 may include a pressure relief system disposed in-line with the vent tubes 210 and/or 214. For example, a pressure relief valve 222 may be coupled to the vent tube 210 between the fuel tank 202 and the vent 212 instead of a vent 212 having a pressure relief system.

Figure 2B:
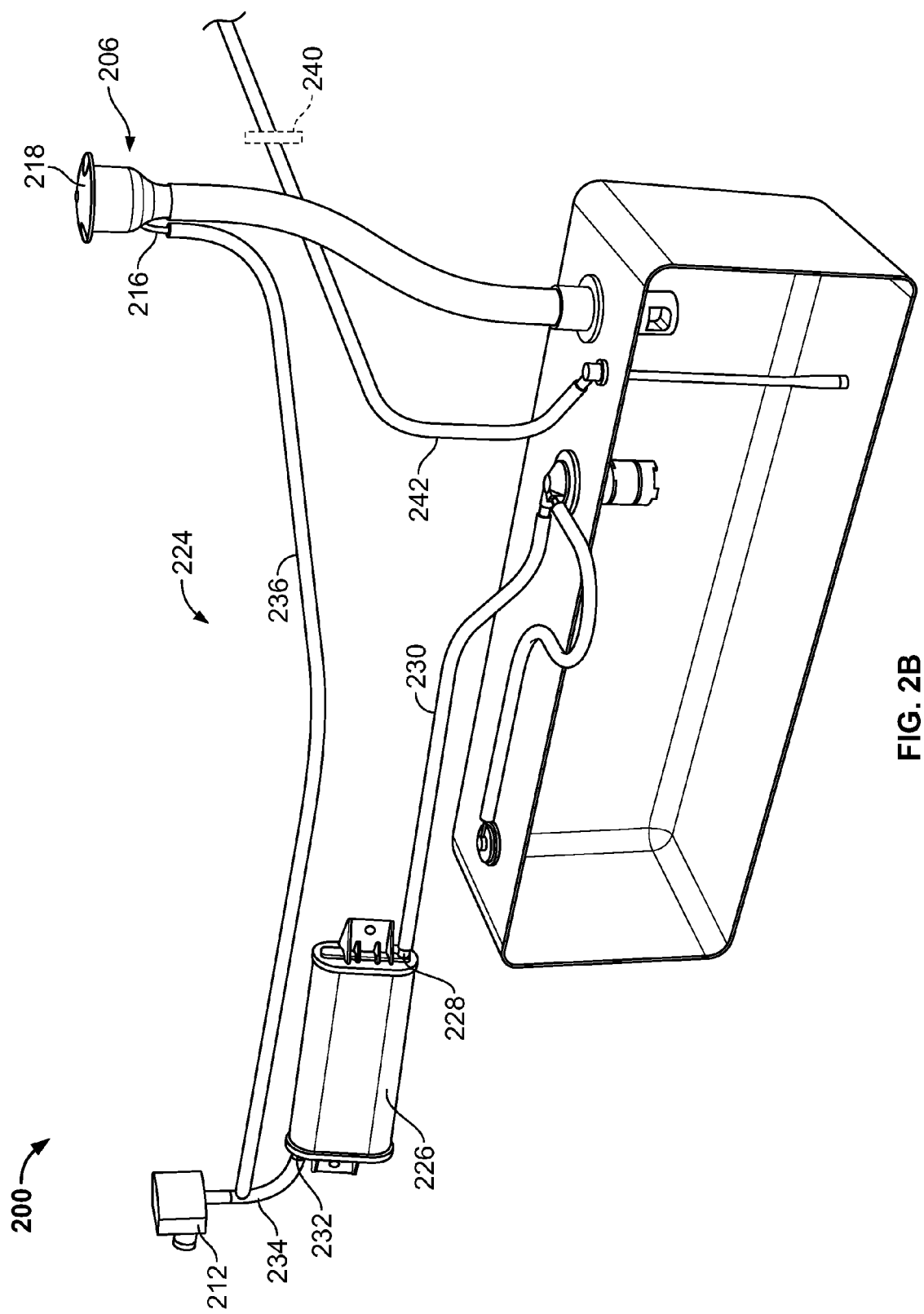

As shown in FIG. 2B, a fuel delivery system 200 may also include a venting system 224 having a vapor collection apparatus 226. In this example, the vapor collection apparatus 226 is fluidly coupled to the fuel tank 202 at a first end or inlet 228 via tubing 230 and is fluidly coupled to the vent 212 at a second end or outlet 232 via tubing 234. A vent tube 236 fluidly couples the outlet 232 of the vapor collection apparatus 226 to the vent 216 of the fuel fill apparatus 206. In this example, both the fuel cap assembly 218 and the vent 212 are implemented with pressure relief systems to provide a sealed fuel delivery system 200. However, in other examples, instead of the vent 112 having a pressure relief system, a pressure relief valve (not shown) may be coupled to the tubing 234 between the outlet 232 and the vent 112.

During a filling operation, the fuel cap assembly 218 is removed and the fuel tank 202 is vented via the vent tube 236. In this manner, the pressure relief systems of the vent 212 and/or the cap assembly 218 do not interfere with the functionality of an automatic nozzle. More specifically, the fuel cap assembly 218 is removed from the fuel fill apparatus 206 and the fuel tank 202 is vented via the tubing 236 and the vent 216 of the fuel fill apparatus 206. As described in greater detail below in connection with FIGS. 8A-8C, the vapor collection apparatus 226 may be mounted to the fuel tank 202.

In general, the venting systems described herein (e.g., the venting systems 208, 220 and/or 224) may be configured to prevent venting fuel vapors or gasses when the pressure of the fuel tank 202 is less than a predetermined pressure value relative to the atmospheric pressure and allow the flow of air to the fuel tank 202 when, for example, an engine (not shown) of a marine craft (not shown) demands fuel (e.g., during operation of the marine craft) from the fuel tank 202 or during a filling operation.

Thus, the example fuel delivery systems 200 provides diurnal emission control by only allowing the emissions of gasses and/or vapors (e.g., hydrocarbons) to the environment via the venting systems 208, 220 and/or 224 when the pressure of the fuel delivery system 200 (e.g., the pressure in the fuel tank 202) is greater than a predetermined pressure value (e.g., 1 psi) relative to atmospheric pressure and allows the flow of air to the fuel tank 202 when the pressure of the fuel within the fuel tank 202 is below a predetermined pressure relative to atmospheric pressure. Thus, in contrast to the known fuel delivery system 100 of FIG. 1, the fuel delivery system 200 include diurnal emission controls to prevent a continuous venting of fuel vapors to the atmosphere, thereby reducing the amount of emissions (e.g., hydrocarbons) released to the environment during, for example, a diurnal cycle.

In yet another example, the fuel delivery system 200 may include a fuel demand valve 240 disposed within a fuel line 242 between the fuel tank 202 and an engine (not shown). The fuel demand valve 240 fluidly decouples the pressurized fuel tank 202 from the engine fuel line 242 to reduce fuel leakage during the diurnal cycle (i.e., when the engine is not demanding fuel). Such an example fuel demand valve 238 is described in U.S. patent application Ser. No. 12/499,545, filed on Jul. 8, 2009, and entitled "A Fuel System for a Marine Vehicle", which is incorporated herein by reference in its entirety.

Figure 3A:
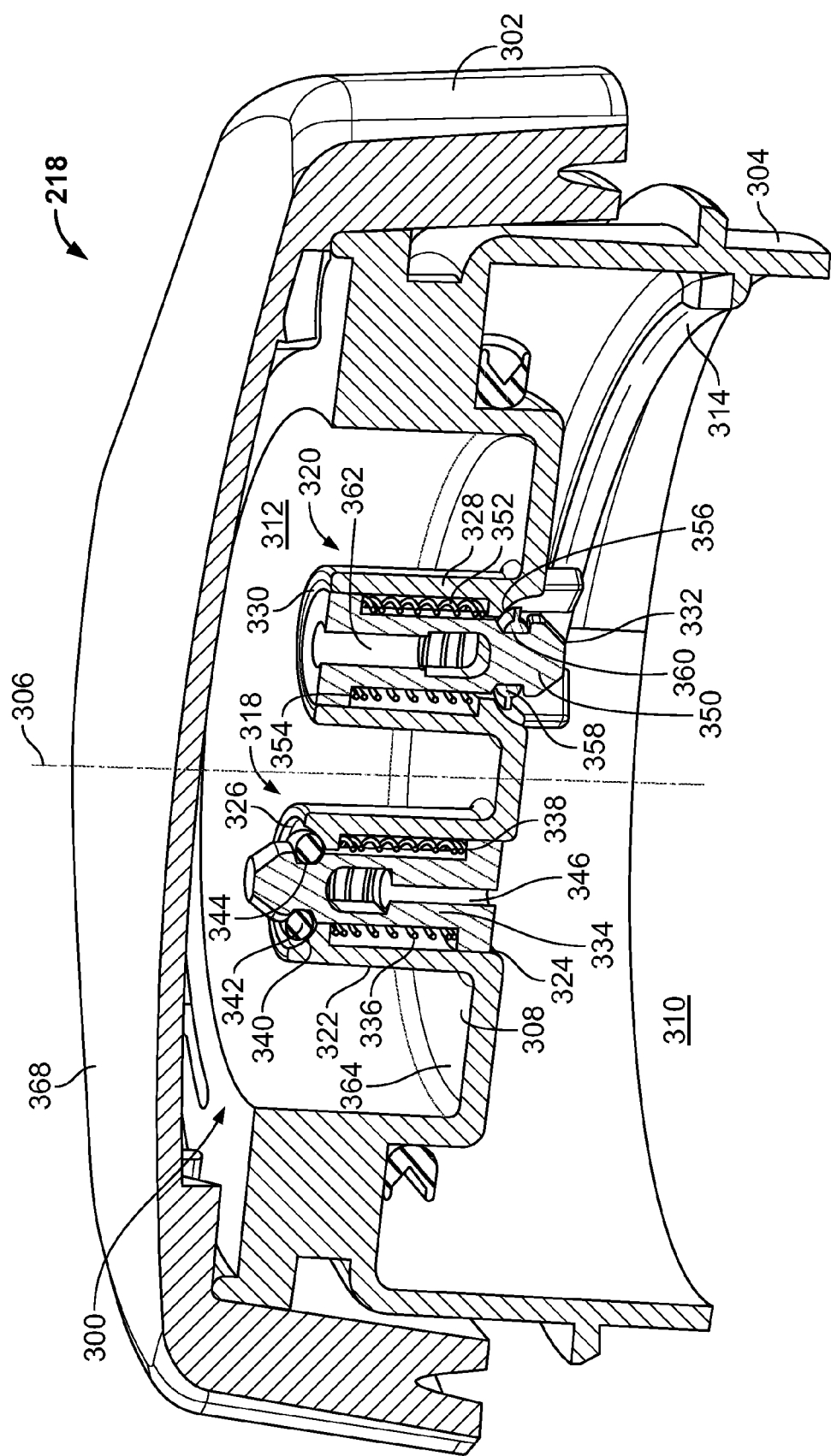
FIGS. 3A-3C illustrate an example fuel cap assembly have a pressure relief system that may be used to implement the example fuel delivery systems of FIGS. 2A-2B.
Figure 3B:
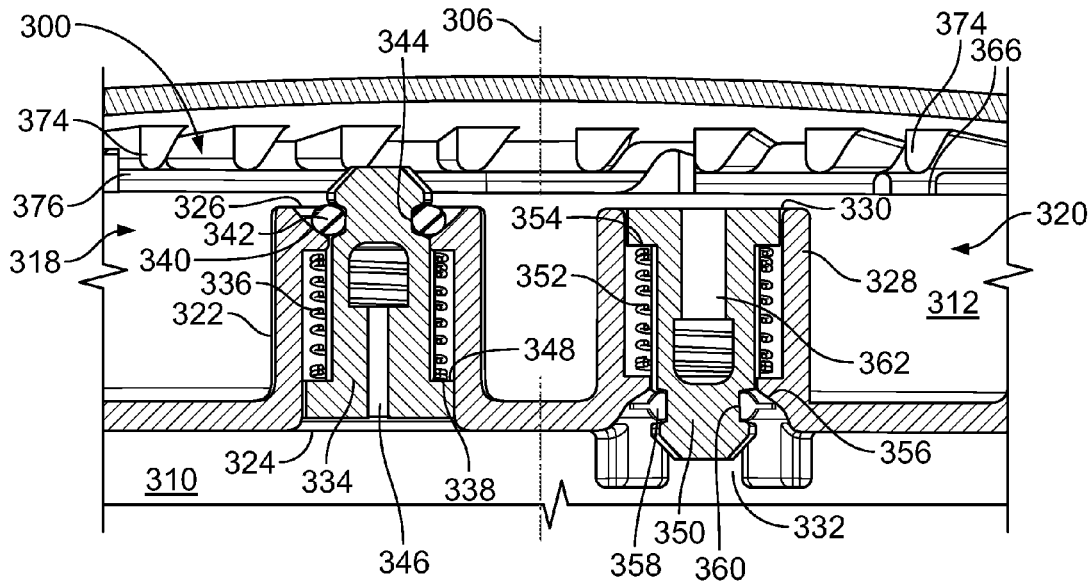
Figure 3C:
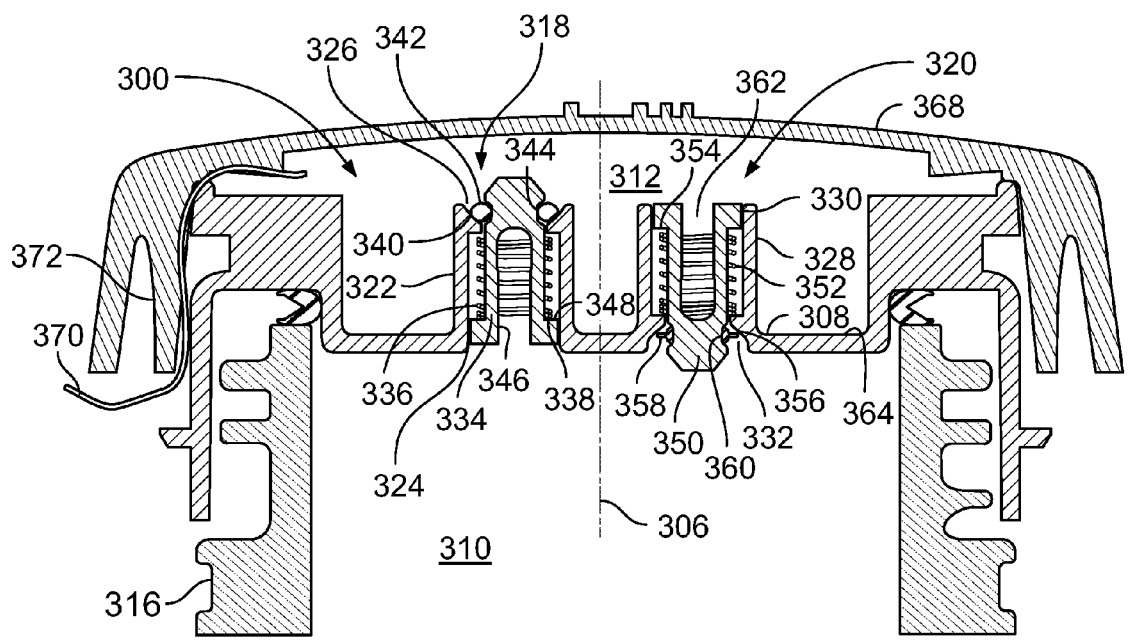

FIGS. 3A-3C illustrate the example fuel cap assembly 218 of the fuel delivery system 200 shown in FIGS. 2A and 2B. Referring to FIGS. 3A-3C, the fuel cap assembly 218 removably couples from the fuel fill apparatus 206 when filling the fuel tank 202 with fuel and provides a pressure relief system 300 when coupled to the fuel fill apparatus 206. The fuel cap assembly 218 can be made of fuel, weather and/or impact resistant resinous materials such as polypropylene, nylon, and/or any other suitable material(s).

As shown in this example, the fuel cap assembly 218 includes a cover 302 coupled to a body portion 304. In the illustrated example, the body portion 304 has a generally cylindrical shape extending along a longitudinal axis 306 that includes a central cavity 308 to define a first side or a pressure side 310 (i.e., a fuel side) and a second side or atmospheric side 312. When coupled to the fuel fill apparatus 206, the first side 310 of the body portion 304 is in fluid communication with the fuel (e.g., pressurized fuel) in the fuel tank 202 and the second side 312 of the body portion 304 is in fluid communication with the atmosphere. The body portion 304 may include threads 314 to threadably couple the fuel cap assembly 218 to a fill tube 316 of the fuel fill apparatus 206. The pressure relief system 300 includes a plurality of fluid valves.

In this example, the body portion 304 includes a first fluid valve 318 disposed within the central cavity 308 adjacent a second valve 320. The first fluid valve 318 has a first valve body 322 defining a first flow path between an inlet 324 in fluid communication with the first side 310 of the body portion 304 (e.g., the pressure side or a fuel tank side) and an outlet 326 in fluid communication with the second side 312 (e.g., the atmospheric side) of the body portion 304. Similarly, the second fluid valve 320 includes a second valve body 328 defining a second flow path between an inlet 330 in fluid communication with the second side 312 of the body portion 304 and an outlet 332 in fluid communication with the first side 310 of the body portion 304.

In the illustrated example, the inlet 324 of the first fluid valve 318 is oriented opposite the inlet 330 of the second fluid valve 320. In other words, the first fluid valve 318 enables fluid flow from the first side 310 to the second side 312 of the body portion 304 when the pressure differential from the first side 310 to the second side 312 across the first fluid valve 318 is greater than a reference or atmospheric pressure. Similarly, the second fluid valve 320 enables fluid from the second side 312 to the first side 310 of the body portion 304 when the pressure differential from the second side 312 to the first side 310 across the second fluid valve 320 is greater than a reference pressure or atmospheric pressure. In other words, the second valve 320 enables fluid flow between the inlet 330 and the outlet 332 when a pressure at the first side 310 is less than atmospheric pressure.

A flow control member 334 is disposed within the first passageway of the first valve body 322 and moves between a first position to prevent fluid flow (e.g., fuel vapors) between the inlet 324 and the outlet 326 and a second position to allow fluid flow between the inlet 324 and the outlet 326. A biasing element 336 (e.g., a spring) is disposed between a seat 338 (e.g., integrally formed with the flow control member 334) and a valve seat 340 of the first fluid valve 318. The biasing element 336 biases the flow control member 334 to the first position such that a seal 342 (e.g., an O-ring) disposed along a portion of the flow control member 334 sealingly engages the valve seat 340 to prevent fluid flow between the inlet 324 and the outlet 326. As shown, the seal 342 is disposed within an annular groove 344 of the flow control member 334. In this example, the flow control member 334 includes a pathway or passage 346 to fluidly couple a first side 348 of the seat 338 and the first side 310 to pressure-balance the flow control member 334 so that a relatively smaller biasing element may be used to bias the flow control member 334 toward the valve seat 340.

Likewise, a flow control member 350 is disposed within the second flow path of the second fluid valve 320 and moves between a first position to prevent fluid flow (e.g., air) between the inlet 330 and the outlet 332 and a second position to allow fluid flow between the inlet 330 and the outlet 332. A biasing element 352 is disposed between a spring seat 354 (e.g., integrally formed with the second flow control member 350) and a valve seat 356 of the second fluid valve 320. The biasing element 352 biases the flow control member 350 to the first position such that a seal 358 (e.g., an O-ring) disposed along a portion of the flow control member 350 sealingly engages the valve seat 356 to prevent fluid flow between the inlet 330 and the outlet 332. As shown, the seal 358 is disposed within an annular groove 360 of the flow control member 350. Also, in this example, the flow control member 350 includes a passage 362 to pressure-balance the flow control member 350 so that a relatively smaller biasing element may be used to bias the flow control member 350 toward the valve seat 356.

In this example, the valve bodies 322 and 328 of the respective first and second valves 318 and 320 protrude from a surface 364 of the body portion 304 within the cavity 308. In this example, the valve bodies 322 and 328 and the respective valve seats 340 and 356 are integrally formed with the body portion 304 as a substantially unitary piece or structure. However, in other examples, the first and second fluid valves 318 and 320 may be separate structures that may be coupled or mounted to the body portion 304. For example, the first and second fluid valves 318 and 320 may be pre-assembled and/or may be coupled to respective openings or passageways of the body portion 304 via fasteners, welding and/or any other fastening mechanism(s). In yet other examples, the fuel cap assembly 210 may include a plurality of the first fluid valves 318 and/or a plurality of the second fluid valves 320.

In yet other examples, the first and/or second fluid valves 318 and 320 may include a ball valve and/or any other suitable valve configurations. In yet other examples, the fuel cap 218 may couple directly to (e.g., to a spigot of) a fuel tank (e.g., a portable fuel tank).

In this example, the body portion 304 includes at least one gap or passage 366 to allow the flow of gases between the second side 312 and an outer surface 368 of the cover 302. The gap 366 is circumferentially spaced about the longitudinal axis 306 of the body portion 304. However, in other example implementations, one or more gaps 366 may be spaced circumferentially on the body portion 304 and/or in any desired manner (e.g., unequal spacing).

The second side 312 and the cavity 308 are substantially covered or sealed via the cover 302. Additionally, the outer surface 368 of the cover 302 has a convex contour or shape to repel and/or prevent liquid from entering the second side 312 of the body portion 304 (i.e., to allow water to run off cover 302).

Additionally, a torturous pathway 370 is formed between the cover 302 and the body portion 304 to substantially prevent the ingress or egress liquid (e.g., fuel, water) through the gap 366. In particular, any liquid fluid (e.g., water) would have to travel between a rim 372 of the cover 302 and the body portion 304 and, thus, the ingress and/or egress of liquid (e.g., fuel, water, etc.) and other contaminants is substantially prevented through the gap 366. In the event liquid (e.g., water) or other contaminates pass through the gap 366, the liquid is substantially captured by the cavity 308. However, the torturous pathway 370 enables the flow of gasses or vapors (e.g., air, fuel vapors, etc.) between the gap 366 and the outer surface 368 of the cover 302.

The cover 302 includes a plurality of protrusions 374 that engage a surface or edge 376 (e.g., a protrusion, a recessed groove etc.) of the body portion 304 to provide a tight fit and prevent the cover 302 from moving (e.g., wobbling) relative to the body portion 304.

In operation, when the fuel cap assembly 218 is coupled to the fuel fill apparatus 206, fuel vapors within the fuel tank 202 are relieved or vented via the first fluid valve 318 and atmospheric air may flow within the fuel tank 202 via the second fluid valve 320. More specifically, during operation of the marine craft and/or during a diurnal cycle, the first fluid valve 318 allows the flow of gasses or fuel vapors between the inlet 324 and the outlet 326 when the pressure at the first side 310 of the body portion 304 is more than a predetermined value (e.g., 1 psi, 5 psi) greater than the second side 312, which is at atmospheric pressure. In other words, the first fluid valve 318 is in the closed position when the pressure at the first side 310 of the body portion 304 is less than a pressure required to overcome the spring force of the biasing element 336. For example, the biasing element 336 may exert a force that moves the first fluid valve 318 to the closed position when the pressure of the fuel in the fuel delivery system 200 (e.g., the fuel tank 202) is less than the predetermined pressure value. In one example, the first fluid valve 318 prevents venting when the pressure on the first side 310 of the body portion 302 is less than, for example, 1 psig and allows venting when the pressure on the first side 310 of the body portion 304 is greater than or equal to 1 psig.

During a diurnal cycle, for example, the pressure at the first side 310 of the body portion 304 may increase to a value greater than the predetermined value required to compress the biasing element 336 and move the flow control member 334 to the open position. When the pressure at the first side 310 is greater than the predetermined value, the pressure exerts a force on the flow control member 334 to move the flow control member 334 between the position shown in FIGS. 3A-3C and the second position in which the seal 342 moves away from the valve seat 340. As a result, fuel vapors and/or gasses may flow or vent between the first side 310 of the body portion 304 and the second side 312 of the body portion 304 via the first fluid valve 318. The vapors or gasses vent to the atmosphere via the gap 366 and the torturous pathway 370. Also, the second fluid valve 320 remains in the closed position when a pressure at the first side 310 of the body portion 304 is greater than the pressure at the second side 312 of the body portion 304. Thus, in contrast to the known fuel delivery system 100 of FIG. 1, the first fluid valve 318 prevents a continuous venting of fuel vapors to the atmosphere, thereby reducing the amount of emissions (e.g., hydrocarbons) released to the environment during, for example, a diurnal cycle.

During operation of the marine craft, the engine draws or demands liquid fuel from the fuel tank 202 via the fuel line 242. The engine creates a vacuum or suction to draw the liquid fuel from the fuel tank 202 causing the pressure in the fuel tank 202 to decrease. Thus, air is required to enable the engine to draw liquid fuel from the fuel tank 202. The second fluid valve 320 moves to an open position when the pressure differential across the second fluid valve 320 is such that the pressure at the first side 310 of the body portion 304 is less than the pressure at the second side 312 of the body portion 304.

When there is a vacuum or suction created during operation of the engine such that the pressure at the first side 310 of the body portion 304 provides a force that is greater than the force exerted by the biasing element 352, the flow control member 350 moves to an open position to allow the flow of air between the inlet 330 and the outlet 332. In other words, the force exerted on the flow control member 350 in a direction toward the outlet 332 of the second fluid valve 320 is greater than the force exerted by the biasing element 352, thereby causing the biasing element 352 to compress such that the flow control member 350 moves away from the valve seat 356 (i.e., downward in the orientation of FIGS. 3A-3C) to allow air flow between the inlet 330 and the outlet 332. As illustrated, air (e.g., at atmospheric pressure) is allowed to flow within the fuel tank 202 via the gap 366 and the torturous pathway 370. The gap 366 provides a pathway for fluid vapor or gas to travel between the fuel tank 202 (not shown) and the atmosphere.

To fill the fuel tank 202, the fuel cap assembly 210 is removed from the fill tube 316. When the fuel cap assembly 210 is removed from the fill tube 316, fuel vapors and/or air pass through the vent 216 (e.g., via the vent tubes 208 or 236) and/or the fill tube 316 to the atmosphere. Also, the first and the second fluid valves 318 and 320 are removed from the fuel delivery system 200 during the filling operation. In other words, the fuel cap assembly 218 operatively decouples the diurnal cycle venting functionality of the fluid valves 318 and 320 from the filling event or operation when the fuel cap assembly 218 is removed from the fill tube 316. In this manner, the first and/or the second fluid valves 318 and 320 do not interfere with operational requirements of an automatic nozzle having a shut-off feature.

Automatic nozzles provide automatic shut-off by causing a valve of the fuel pump to close and prevent fuel flow via the nozzle during a filling operation. During a filling operation, automatic nozzles typically require a fuel tank pressure of less than 0.5 psi for the automatic shut-off feature to function or operate properly (e.g., a premature nozzle shut-off during a filling operation). Thus, although the pressure relief system 300 may be configured to vent at fuel tank pressures greater than, for example, 1 psig, the pressure relief system 300 does not interfere with the automatic nozzle because the pressure relief system 300 is operatively decoupled from the fuel delivery system 200 during the filling event. Once filling of the tank is complete, the cap assembly 218 is again coupled to the fill tube 316.

Additionally or alternatively, although not shown, a deflection shield may be disposed within the fill tube 316 and/or may be coupled (e.g., integrally coupled) to the body portion 304 to deflect any liquid fuel traveling upwardly from the fuel tank 202 through the fill tube 316 in the event of a fuel surge caused by splashing or sloshing during boat movement or the like. In the event that liquid (e.g., fuel) bypasses the first and/or second valves 318 and 320, the liquid must pass upwardly through the cavity 308 and in a succession of steps through the gap 366 and the torturous pathway 370. In particular, the liquid fuel will be captured by the cavity 308, thereby substantially preventing the liquid fuel from escaping and/or passing through the gap 366.

In yet other examples, a membrane (e.g., a Teflon® membrane) may be implemented with the first fluid valve 318 and/or the second fluid valve 320. For example, the membrane may be disposed within or adjacent the inlets 324 and 330, the outlets 326 and 332, the passageways of the valve bodies 322 and 328, the gap 366, and/or any other suitable portion of the fuel cap assembly 218. The membrane enables the flow of gasses and/or vapors therethrough, but prevents the flow of liquid through the first fluid valve 318 and/or the second fluid valve 320. In other words, a membrane may be disposed within the first fluid valve 318 and/or the second fluid valve 320 to prevent the ingress or egress of liquid or other contaminants and allow the flow of gasses therethrough. Such examples are described in U.S. patent application Ser. No. 12/061,163, filed Apr. 2, 2008, and entitled Fuel Cap Apparatus For Use With Fuel Venting Systems, which is hereby incorporated herein by reference in its entirety.

Additionally or alternatively, a membrane (e.g., a Teflon®) may be disposed within other components of the fuel delivery system 200. For example, a membrane may be disposed within the vent tubes 210, 214, 230, 234 and/or 236, the vent 212, the inlet 228 and/or the outlet 232 of the vapor collection apparatus 226, and/or any other component of the fuel delivery system 200. Such examples are described in U.S. patent application Ser. No. 12/391,782, filed Feb. 24, 2009, and entitled Fuel Venting Systems Having Protective Membranes, which is hereby incorporated herein by reference.

Although not shown in detail, the vent 212 of the example fuel delivery system 200 may be implemented with the pressure relief system 300 shown in FIGS. 3A-3C, a pressure relief valve, and/or any other pressure relief apparatus.

FIG. 4A illustrates another example fuel delivery system 400 described herein. As shown, a fuel tank 402 includes a passage or coupling 404 to receive a plurality of components 406 of the fuel delivery system 400. For example, the coupling 404 may receive a vent valve 408, an anti-siphon valve 410, a grade valve 412, an inlet valve 414 of a fuel fill apparatus 416, tubing, and/or any other components of the fuel delivery system 400 that is in fluid communication with and/or coupled to the fuel tank 402. In this example, the coupling 404 comprises a plate having at least two apertures to receive the plurality of components 406. Also, the coupling 404 provides a seal between an exterior of the fuel tank 402 and a cavity 418 of the fuel tank 402. The coupling 404, for example, may be coupled to the fuel tank 402 via a clamp and a compression gasket to provide a seal.

In this manner, the fuel tank 402 only requires a single opening or point of entry for the plurality of components 406 (e.g., valves and/or other components) by mounting or assembling the plurality of components 406 with the fuel tank 402 via the single coupling 404. For example, at least a portion of the plurality of components 406 may be disposed within the cavity 418 of the fuel tank 402 via the coupling 404 and/or the plurality of components 406 may be mounted to the fuel tank 402 via the coupling 404. In other words, the fuel tank 402 includes the cavity 418 to store a liquid fuel and includes only one opening or aperture in fluid communication with the cavity 418. Additionally, in this example, the grade valve 412 is disposed within the cavity 418 of the fuel tank 402 at a distal end relative to the coupling 404. For example, the grade valve 412 may be coupled to an interior surface 420 of the cavity 418 via a clip, a fastener, a chemical fastener, and/or any other suitable fastening mechanism(s). Tubing 422 fluidly couples the grade valve 412 to the vent valve 408. The tubing 422 may also be coupled to the interior surface 420 of the fuel tank 402 via a clip, a fastener, etc. In this manner, the grade valve 412 is permanently coupled to the fuel tank 402 and is not serviceable.

As a result, only a single access or service point is required for inspection to satisfy government regulations that may require an access point to inspect (e.g., visually inspect) the coupling 404 of the fuel tank 402. In other words, only one vehicle access panel may be required to enable access to the coupling 404. Furthermore, only one mounting is required to mount the plurality of components 406 to the fuel tank 402, thereby facilitating assembly of the fuel delivery system 400 and reducing manufacturing costs. Although not shown, the example fuel tank 402 includes an aperture to receive the coupling 404. The fuel tank 404 may be formed via rotomolding, injection molding, blow molding, rotational molding, or any other suitable manufacturing process(es).

Figure 4B:
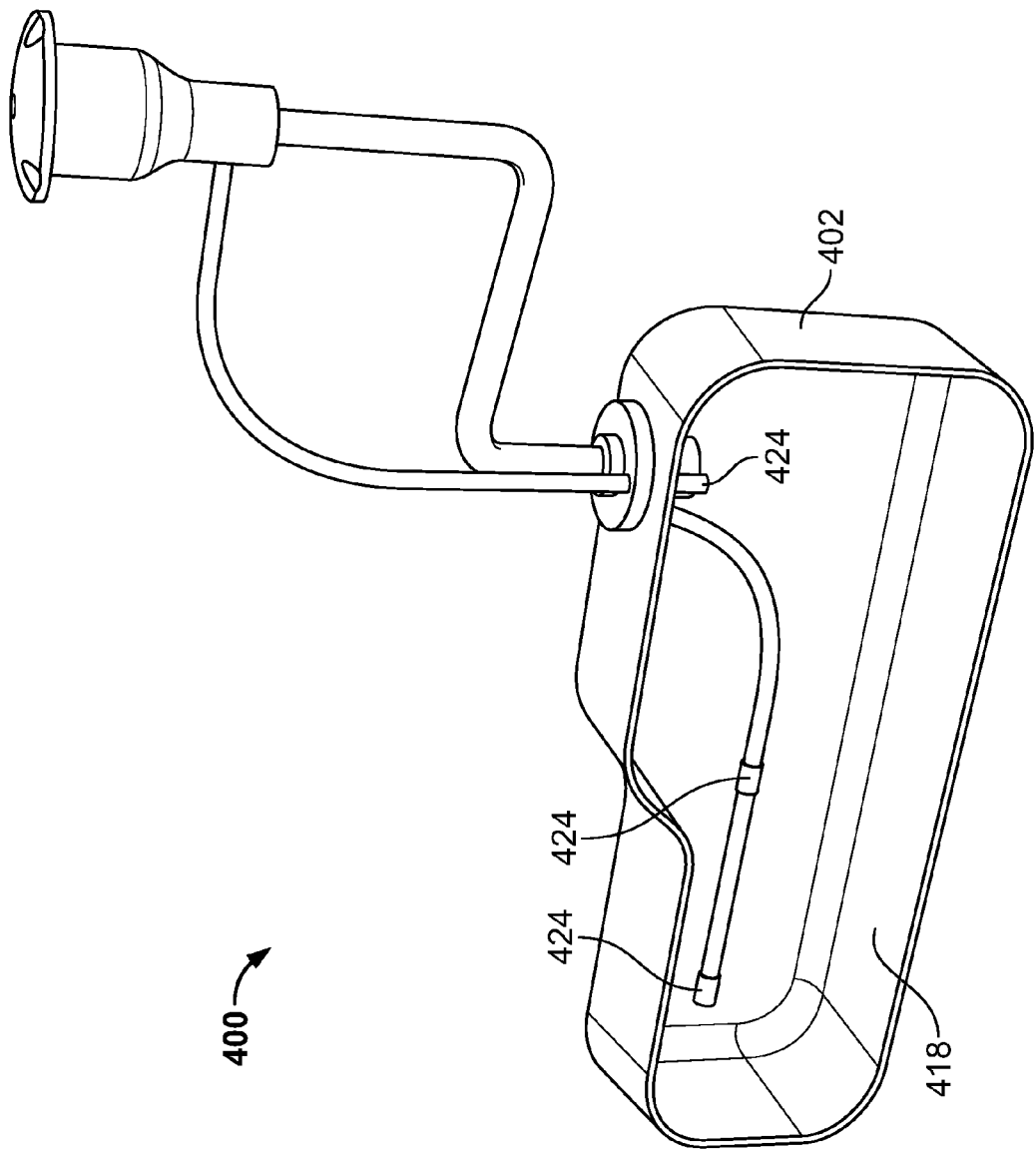

In other examples, as shown in FIG. 4B, a plurality of components 424, tubing, or other fuel delivery system components may be coupled or mounted within the cavity 418 of the fuel tank 402 via the coupling 404. In yet other examples, the coupling 404 can be used to implement other fuel tanks or fuel delivery systems. For example, the coupling 404 may be used to implement the example fuel tank 202 of the example fluid delivery system 200 of FIGS. 2A and 2B.

Figure 5:
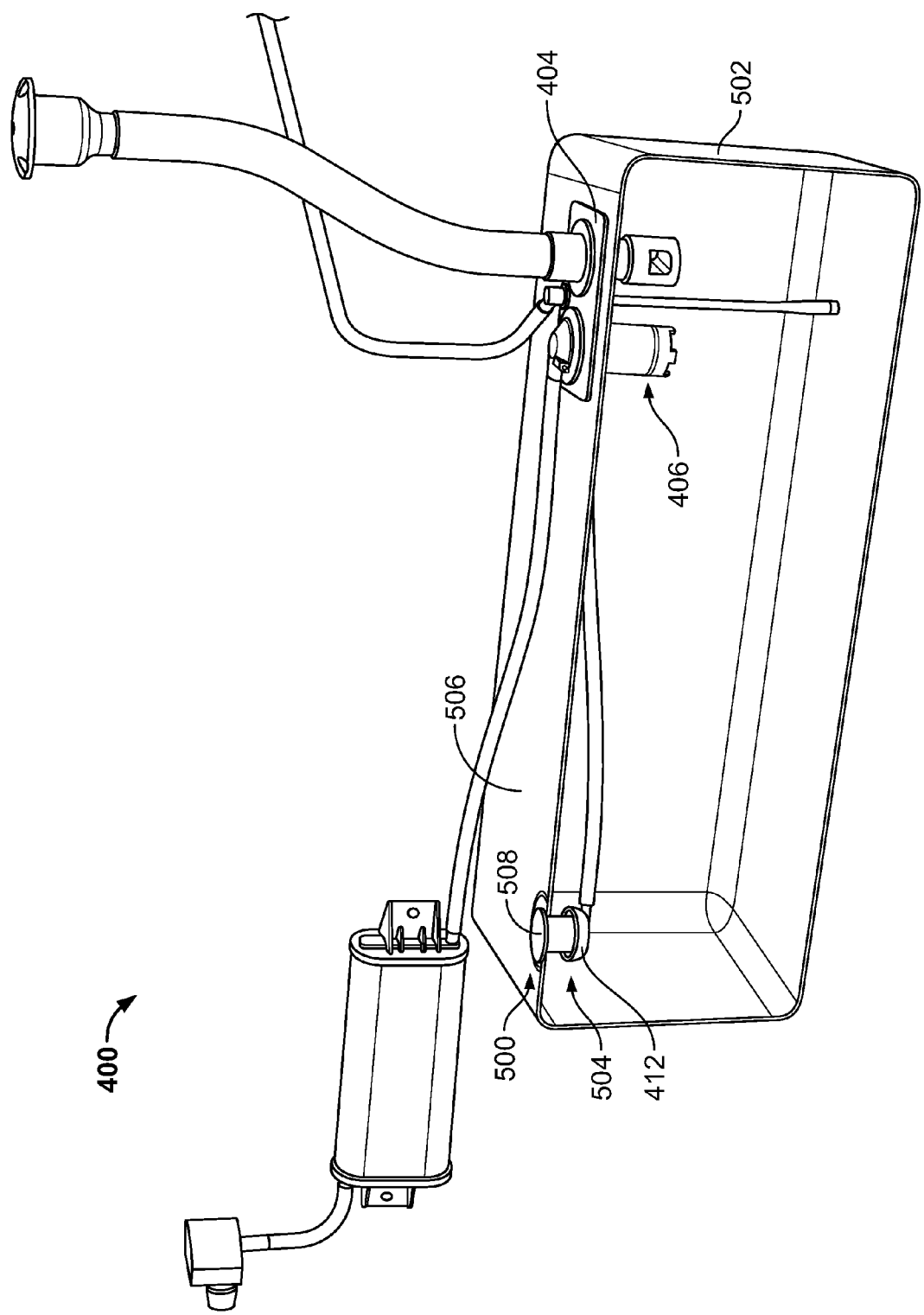
FIG. 5 illustrates yet another example fuel delivery system described herein.

FIG. 5 illustrates the example fuel delivery system 400 of FIGS. 4A and 4B, but implemented with an example low permeation insert material or puck 500. More specifically, the insert material 500 may be coupled to, disposed within, and/or embedded within a fuel tank 502. The insert material 500 enables a coupling 504 (e.g., the vent valve 408 of FIG. 4) to be coupled to a surface 506 of the fuel tank 502 via plastic welding (e.g., hot plate welding) to permanently attach the coupling 504 to the fuel tank 502. Permanently attaching the coupling 504 to the fuel tank 502 eliminates the need to provide an access panel to visually inspect the coupling 504 because the coupling 504 is not serviceable, thereby reducing manufacturing costs of the marine vehicle while being in compliance with the governmental regulations. Additionally, the insert material 500 enables the coupling 504 (e.g., valves, etc.) to be attached to the fuel tank 502 via welding (e.g., plastic welding) while providing or maintaining a relatively low permeation characteristic.

Typically, the fuel tank 502 may be made of a thermoset material. Thermoset materials such as, for example, cross-linked Polyethelyne typically have a high-temperature resistant property, a relatively high strength property, a relatively high resistance to chemical degradation, a relatively high impact and tensile strength characteristic, and are resistant to brittle fractures.

Although, such thermoset materials provide high temperature resistance, which is required to comply with certain governmental safety regulations (e.g., Title 33 of the Code of Federal Regulations), the coupling 504 cannot be attached to a surface (e.g. a surface of the fuel tank 102 of FIG. 1) of a fuel tank made of a thermoset material via plastic welding (e.g., hot plate welding). Thus, such a coupling must be coupled via, for example, a clamp and compression gasket, a fastener, etc. Although these fastening mechanism(s) provide a reliable seal, these fastening mechanism(s) may cause leakage of fuel and/or vapors and, thus, may require access (e.g., via an access panel) for visual inspection to be incompliance with certain diurnal emissions regulations.

The insert material 500 may be integrally formed with, coupled to, embedded within, and/or disposed within the fuel tank 502 via, for example, blow molding, rotational molding, insert molding, and/or any other suitable manufacturing process(es). For example, the insert material 500 may be insert molded with the fuel tank 502.

Further, in one example, to attach the coupling 504 to the fuel tank 502, an opening is formed within the insert material (e.g. via a drill). The coupling 504 may include a thermoplastic end 508 (e.g., a flange) that may be coupled to the coupling 504 and/or may be integrally formed with the coupling 504. The coupling 504 is disposed within the fuel tank 502 via the opening of the insert material 500 such that the end 508 of the coupling 504 substantially aligns with the insert material 500 of the fuel tank 502. The end 508 and the insert material 500 are heated to a temperature above the melting temperature of material of the end 508 and the material of the insert material 500. When the materials of the end 508 and the insert material 500 cool, the materials solidify or harden, thereby permanently attaching the coupling 504 to the fuel tank 502. In other examples, the coupling 504 may be coupled to the fuel tank 502 via any other suitable method(s).

In another example, the fuel tank 502 may be implemented with the insert material 500 adjacent the coupling 404. In this manner, the coupling 404 may be coupled to the fuel tank 502 via plastic welding. In this manner, welding the couplings 504 and/or 404 to the fuel tank 502 permanently fixes or attaches the coupling 504 and/or 404 to the fuel tank 502 and, thus, the plurality of components 406 and are not serviceable. As a result, access (e.g., via a vehicle panel) to the plurality of components 406 and/or couplings 404 and 504 may not be required per government regulations, thereby reducing manufacturing costs of the marine vehicle.

In another example, the fuel tank 402 of FIG. 4A may be implemented with the insert material 500 adjacent the coupling 404. As a result, in this example, the fuel tank 402 does not require an access for visual inspection and/or to service the coupling 404. Additionally or alternatively, in other examples, a fuel tank (e.g., the fuel tank 102 of FIG. 1) may be implemented with a plurality of insert materials 500 to enable a plurality of couplings or components (e.g., the couplings 108 and/or 110) to be coupled to the fuel tank via plastic welding. For example, the plurality of components may include, but are not limited to, grade valves, vent valves, fill line inlet valves, anti-siphon valves, or any other component or coupling to be coupled to the fuel tank.

FIG. 6A illustrates the example insert material 500 of FIG. 5. FIG. 6B illustrates a cross-section of the example insert material 500 of FIG. 6A. Referring to FIGS. 5, 6A and 6B, the insert material 500 includes a first layer material or barrier material 602 coupled to a second layer material 604. In particular, the barrier material 602 is a copolymer material (e.g., Ethylene Vinyl Alcohol) having a low permeation characteristic or rate. In other words, the barrier material 602 has a high resistance to the passage of liquids and/or gasses therethrough. Although the barrier material 602 has a low permeation characteristic, which is desirable to reduce leakage of emissions through the barrier material 602, the barrier material 602 is incapable of supporting an attachment of a component via, for example, welding (e.g., hot plate welding). Coupling components (e.g., the coupling 504) to the fuel tank 502 via welding substantially reduces or eliminates leakage or emissions where the coupling 504 attaches or couples to the fuel tank 502.

The second layer material 604 is a thermoplastic material that enables attachment of the coupling 504 to the fuel tank 502 via welding (e.g., plastic welding, hot plate welding). Additionally, as shown in this example, a third layer material 606 comprising a thermoplastic material (e.g., High density Polyethylene) may be coupled to the barrier material 602 such that the barrier material 602 is disposed between the second and third layer materials 604 and 606. Although the second layer material 604 and/or the third layer material 606 enable attachment of components via welding, fuel tanks made of thermoplastic materials are typically not permitted for use as integrated (i.e., permanently installed) fuel tanks because they have relatively low temperature resistance and, thus, do not comply with certain governmental standards (e.g., SCG Fire safety standards per CFR 33).

Thus, a fourth or outer layer material 608 made of a thermoset material may be disposed adjacent the second layer material 604 to provide an outer layer made of a thermoset layer material when integrated with the fuel tank 502. Alternatively, the example insert material 500 may be implemented with a fuel tank made of thermoplastic material. Additionally, a fifth layer material 610 may be disposed adjacent the third layer material 606 to provide an interior layer of a thermoset material when integrated with the fuel tank 502. Thus, the second and third layer materials 604 and 606 and the barrier material 602 may be captured or disposed between the layers 608 and 610, which may be made of a thermoset material.

The barrier layer 602 may be any material having a low permeation characteristic or rate such as, for example, Ethylene Vinyl Alcohol (hereinafter EVOH), a petroseal material, and/or any other material having a relatively high barrier characteristic (i.e., a low permeation rate). An EVOH copolymer is defined by the mole percent (%) of the ethylene content. Thus, the EVOH material can be configured to have a lower ethylene content grade to provide a higher barrier property or lower permeation characteristic. In some examples, the barrier layer 604 may include more than one layer and/or may be made of more than one different low permeation material.

The second and/or third layer materials 604 and 606 may be a thermoplastic material such as, for example, a high density polyethelyne. In other examples, the thermoplastic material may be a polyvinyl chloride material, a nylon material, a plyurethane prepolymer material and/or any other thermoplastic material that softens when exposed to heat and returns to its original condition when cooled to room temperature. The thermoplastic material typically has a relatively low temperature melting point compared to the thermoset material. In some examples, the second layer material 604 may be made of a first thermoplastic material and the third layer material 606 may be made a second thermoplastic material different than the first thermoplastic material.

The second and/or third layer materials 604 and 606 enable a coupling (e.g., the coupling 504) to be permanently coupled to the fuel tank 502 via, for example, welding. For example, to attach the coupling 504 to the fuel tank 502, the second and/or the third layer materials 604 and 606 are heated to a temperature greater than the melting temperature of the thermoplastic material. In some examples, an end of the coupling 504 may also be heated (above the melting point) if made from a thermoplastic material. When the second and/or third layer materials 604 and 606 are heated above the melting temperature of the thermoplastic material, the second and/or third layer materials 604 and 606 melt or liquefy. The coupling 504 is disposed adjacent the second and/or third layer materials 604 and 606. When the second and/or third layer materials 604 and 606 cool to room temperature, the second and/or third layer materials 604 and 606 solidify or harden, thereby permanently coupling or attaching the coupling 504 to the fuel tank 502. Further, the barrier material 602 substantially surrounds and/or is embedded within the solidified or hardened second and/or third layer materials 604 and 606 to provide a barrier and prevent leakage of hydrocarbons from the fuel tank 502 to the environment via the point of attachment of the coupling 504.

As noted above, the fourth and fifth layer materials 608 and/or 610 may be made of a thermoset material such as, for example, a cross-linked polyethylene copolymer. Such a cross-linked polyethylene copolymer provides resistance to high temperatures and high impact forces. In other examples, the layers 608 and/or 610 may be phenolics, polyesters, epoxies and/or any thermoset material that solidifies or sets irreversibly when heated (i.e., having high temperature characteristics) and has high impact characteristics. In some examples, the fourth layer material 608 may be made of a first thermoset material and the fifth layer material 610 may be made a second thermoset material different than the first thermoset material.

Additionally or alternatively, although not illustrated in the example, an adhesive or bonding agent may be disposed between any or all of the layers 602, 604, 606, 608, and/or 610 to facilitate adhesion between the different layers of material. For example, adhesion between the layers may be achieved via chemical bonding by including an adhesive material or agent on or in some or all of the layers 602-610.

Thus, the example insert material 500 can be configured to provide a low permeation characteristic and has high temperature and impact resistance, while enabling permanent attachment of components such as valves via welding (e.g., hot plate welding). Additionally, the example insert material 500 may be configured in any suitable shape, profile, cross-section, pattern, etc. For example, FIGS. 6C-6J illustrate the insert material 500 configured to have a variety of different orientations, cross-sections, profiles, patterns, etc. For example, the example insert material 500 may be implemented with only some of the layers 602-610 and/or any combination of the layers 602-610.

FIGS. 7A-7C, illustrate the example overflow prevention apparatus or fluid coupling 700 that may be used to implement a fuel delivery system such as, for example, the fuel delivery systems 100, 200 and/or 400. In this example, the fluid coupling 700 includes a first portion 702 fluidly coupled to a second portion 704 to define a liquid fill passage 706. The fluid coupling 700 also includes a flange 708 between the first and second portions 702 and 704 to couple the fluid coupling 700 to a surface 710 of a fuel tank 712. The flange 708 includes apertures 714 that receive fasteners (not shown) to couple the fluid coupling 700 to the fuel tank 712. As shown, the first portion 702, the second portion 704 and the flange 708 are integrally formed as a unitary structure.

However, in other examples, the first portion 702, the second portion 704 and/or the flange 708 may be separate pieces that are coupled together via fasteners, chemical fastener or agents, and/or any other suitable fastening mechanism(s). In yet other examples in which the fuel tank 712 is made from a plastic material (e.g., a thermoset material, a thermoplastic material, etc.), the fuel tank 712 may include, for example, the insert material 500 to enable the fluid coupling 700 to be plastically welded to the surface 710 of the fuel tank 712 (e.g., via the flange 708).

In this example, the first portion 702 has a cylindrically-shaped body coaxially aligned with the second portion 704, which also has a cylindrically-shaped body. Additionally or alternatively, a first inner diameter 716 of a passageway 718 of the first portion 702 may be sized and/or shaped differently from, or substantially similar to, a diameter 720 of a passageway 722 of the second portion 704. Additionally, the passageway 718 and/or the passageway 722 (and thus, the liquid fill passage 706) may have a tapered profile, a hyperboloid-shaped profile, and/or any profiles. For example, a first portion of the passageway 718 may be sized different than a second portion of the passageway 718 and/or the passageway 722. Although the example fluid coupling 700 is depicted as having a first cylindrical body and a second cylindrical body, the first portion 702 and/or the second portion 704 may have any other shape or geometry such as, for example, a square-shaped body, a rectangularly shaped body, and/or any other polygonal shape, etc.

The first portion 702 of the fluid coupling 700 is to be fluidly coupled to a fill tube 724 (e.g., the fill tube 316 of FIG. 3C) or an inlet valve (e.g., the inlet valve 414 of FIG. 4A) to receive a liquid (e.g., a fuel) via the liquid fill passage 706. In some examples, the fluid coupling 700 may be integrally formed with the fill tube 724 and/or an inlet valve as a unitary piece or structure. The second portion 704 extends into a cavity 726 of the fuel tank 712 a predetermined distance 728 relative to an interior surface 730 of the fuel tank 712. The second portion 704 has an aperture or opening 732 adjacent an end 734 of the second portion 704 to convey the liquid received via the liquid fill passage 706 to the cavity 726 of the fuel tank 712. Although the opening 732 is shown as being is coaxially aligned with the passageway 722, in other examples, the opening 732 may be disposed along a surface of the second portion 704 such that the opening 732 is substantially perpendicular to the passageway 722.

When coupled to the fuel tank 712, the fluid coupling 700 provides a gauge to determine a level of liquid fuel 738 in a fuel tank 712 during a filling event. For example, some manufacturers recommend a certain amount of space or ullage 736 in the fuel tank 712. Additionally or alternatively, the fluid coupling 700 substantially reduces or prevents liquid fuel from overflowing to a deck of the boat during a filling operation via the fill tube 724.

In operation, when the fuel tank 712 is being filled, the volume or the level of liquid fuel 738 within the fuel tank 712 rises or increases. As the volume of the liquid fuel 738 in the fuel tank 712 increases, the vapors and/or air within the fuel tank 712 are vented or displaced via a vent or venting system 740. For example, the venting system 740 may be configured similar or identical to as the venting systems 208, 220 and/or 224 described above in connection with FIGS. 2A and 2B. As shown, the second elongate portion 704 is configured to extend into the cavity 726 of the fuel tank 712 the predetermined distance 728 to indicate the desired liquid fuel level within the fuel tank 712. In other words, the second portion 704 extends within the fuel tank 712 a distance that provides or correlates to a maximum desired liquid fuel level within the fuel tank 712. Additionally or alternatively, the second portion 704 prevents at least one of a gas or a vapor from flowing between the fuel tank 712 and the liquid fill passage 706 when the fuel in the fuel tank 712 is within or adjacent the opening 732.

For example, during a filling event, an automatic nozzle is fluidly coupled to the fluid coupling 700 via the fill tube 724. An automatic nozzle provides an automatic shut-off by causing a valve of the fuel pump to close and prevent fuel flow via the nozzle to the fuel tank 712 during a filling operation when a sensor coupled to the valve detects a certain pressure within the fuel tank 712. For example, when the sensor detects a pressure within the fuel tank 712 via the fill tube 724 that is greater than a predetermined pressure, the sensor causes the automatic nozzle to shut-off fluid flow.

Thus, as the liquid fuel 738 engages the opening 732 of the second portion 704, a back pressure is created within the liquid fill passage 706, which is fluidly coupled or in fluid communication (e.g., in direct fluid communication) with the nozzle via a passage 742 of the fill tube 724. Thus, the back pressure causes the sensor to trigger the automatic shut-off when the liquid fuel 738 reaches the desired level (i.e., the opening 732). Additionally or alternatively, the liquid fuel 738 may travel within the fill tube 724 and/or the vent 740, which can also trigger the sensor to shut-off flow from the nozzle.

Additionally or alternatively, the second portion 704 may include another aperture or bleed hole 744 between the end 734 and the interior surface 730 of the fuel tank 712. In this example, the bleed hole 744 is sized substantially smaller (e.g., has a smaller diameter) than the diameter of the opening 732 and has an axis that is substantially perpendicular to an axis of the liquid fill passage 706. When the automatic nozzle is triggered to shut-off due to the back pressure within the liquid fill passage 706 as the liquid fuel 738 reaches the opening 732, the bleed hole 744 enables the pressure (e.g., the backpressure) within the liquid fill passage 706 and the pressure within the fuel tank 712 to equalize. Additionally, the bleed hole 744 enables air to flow between the liquid fill passage 706 and the fuel tank 712 when the liquid fuel 738 expands due to thermal expansion and the liquid fuel 738 is adjacent the opening 732.

Although not shown, the vent 740 may also be implemented with the fluid coupling 700. Similarly, at least a portion of a fluid coupling coupled to the vent 740 may be at least partially disposed within the cavity 726 of the fuel tank 712 a predetermined distance to prevent at least one of a vapor or a gas from flowing to the atmosphere via the vent 740 when the liquid fuel 738 in the fuel tank 712 engages an opening (e.g., the opening 732) of the fluid coupling. A second end of a fluid coupling of the vent 740 may extend a predetermined distance within the fuel tank 712 that is substantially similar to or different from the predetermined distance 728 the second portion 704 of the fluid coupling 700 extends into the fuel tank 712 relative to the interior surface 730. The example fluid coupling 700 may also be used with known fuel delivery systems such as, for example, the fuel delivery system 100 shown in FIG. 1. For example, the fluid coupling 700 may be fluidly coupled to the fill tube 104 and/or the vent line 114.

Figure 8B:
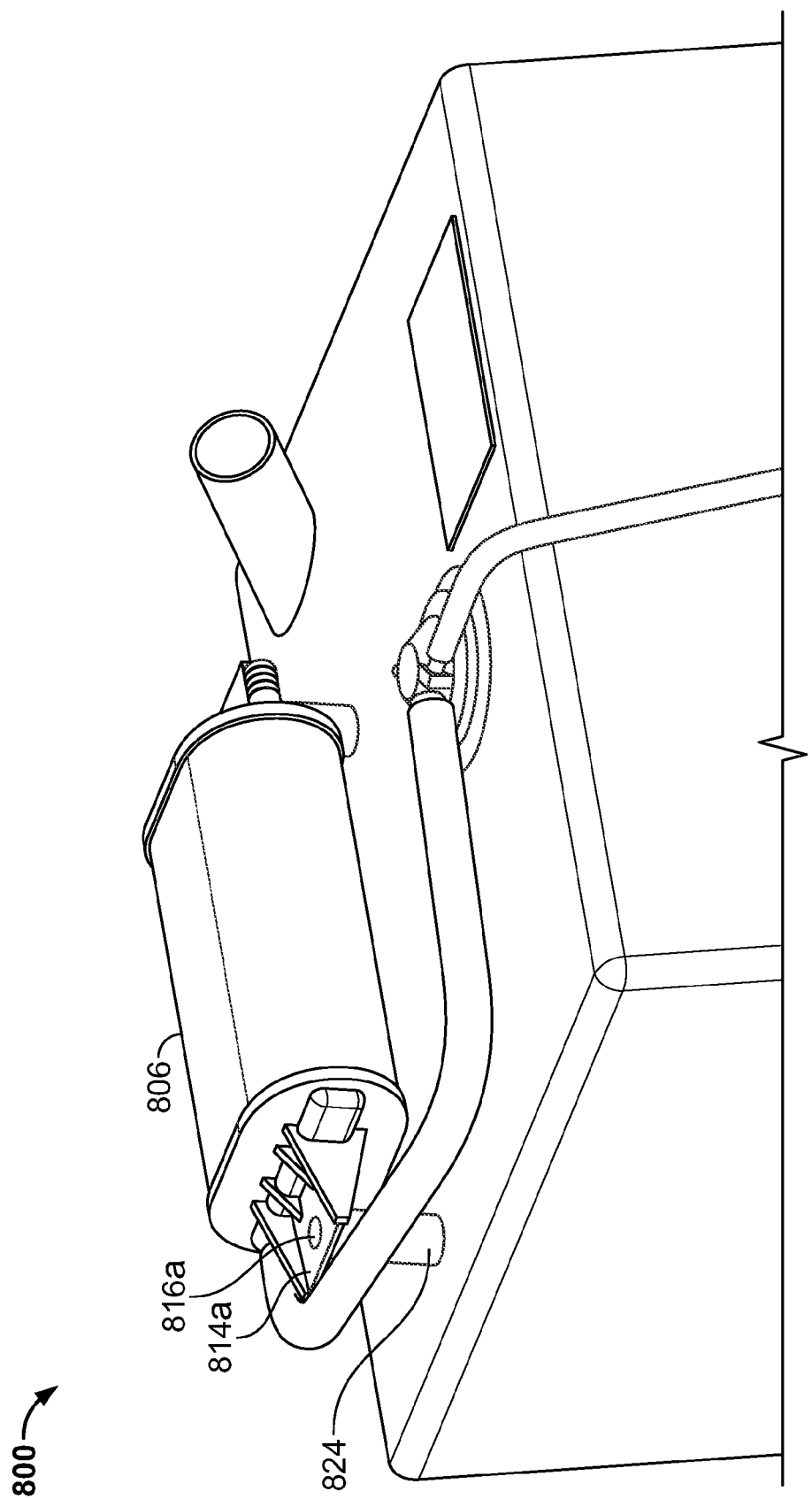
Figure 8C:
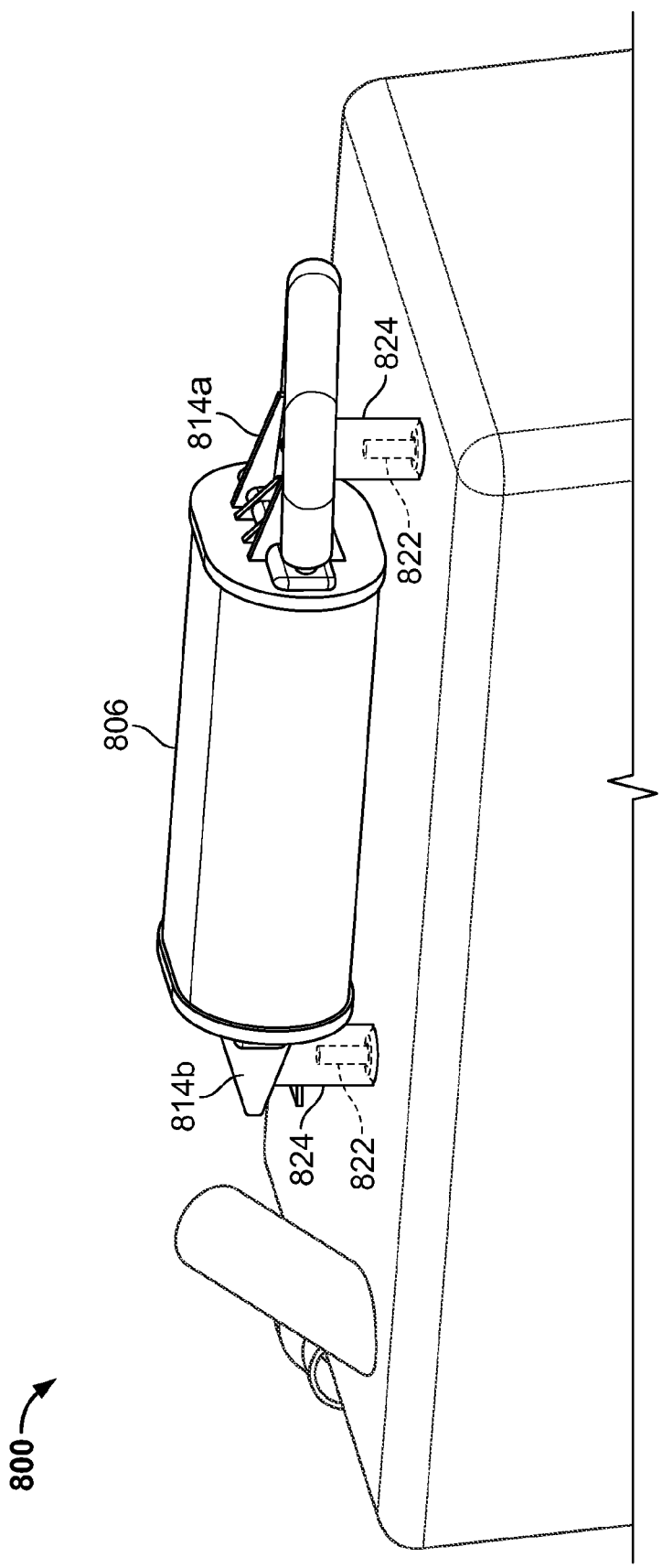

FIGS. 8A-8C illustrate another example fuel delivery system 800 described herein. In this example, the fuel delivery system 800 includes a vapor collection apparatus 802 coupled or mounted to a fuel tank 804 (e.g., a permanently installable fuel tank or a portable fuel tank). The vapor collection apparatus 802 comprises a canister 806 disposed between an end 808a and an end 808b. The ends 808a and 808b capture the canister 806 so that a port or inlet 810 and a port or outlet 812 of the respective ends 808a and 808b form a pathway through the canister 806. The ends 808a and 808b include mounting brackets 814a and 814b that include respective apertures or openings 816a and 816b. The canister 806 includes an emission(s)-capturing or filter material (e.g., an adsorbent material) such as, for example, activated carbon, charcoal, etc., that collects and stores evaporative emissions such as, for example, hydrocarbons to reduce pollution to the environment.

The canister 806, for example, may be in fluid communication with the fuel tank 804 via the inlet 810 and may be in fluid communication with a vent 818 (e.g., the vent apparatus 212 of FIGS. 2A-2B) via the outlet 812. In this manner, fuel vapors entering the canister 806 through the inlet 810 from the fuel tank 804 pass through the filter material in the canister 806 before passing to the outlet 812 and, thus, the vent 818. The stored emissions captured and stored by the canister 806 are returned or carried to the fuel tank 804 as air flows through the canister 806 when the air is drawn from the atmosphere to the fuel tank 804 via a vent line 820. The canister 806 may be made of corrosion resistant materials such as, for example, thermoplastic polymers, stainless steel, aluminum, a combination thereof, and/or any other suitable material.

As more clearly shown in FIGS. 8B and 8C, the example vapor collection apparatus 802 is mounted to the fuel tank 804 via the ends 808a and 808b. In particular, the fuel tank 804 includes fasteners 822 such as, for example, a stud, a bolt, an internally threaded boss, and/or any other suitable fastening mechanism(s). The fasteners 822 may be integrally formed with the fuel tank 804. For example, the fuel tank 804 may include an internally threaded boss 824 protruding from a surface 826 of the fuel tank 804 and which may be integrally formed with the fuel tank 804 via blow molding, injection molding, rotational molding, and/or any other suitable process(es). A stud or screw (not shown) may be received by the apertures 816a and 816b and the boss 824 to attach or mount the vapor collection apparatus 802 to the fuel tank 804. Additionally, due to the proximity of the vapor collection apparatus 802 relative to the fuel tank 804, a shorter length tubing 828 can be used.

Figure 9A:
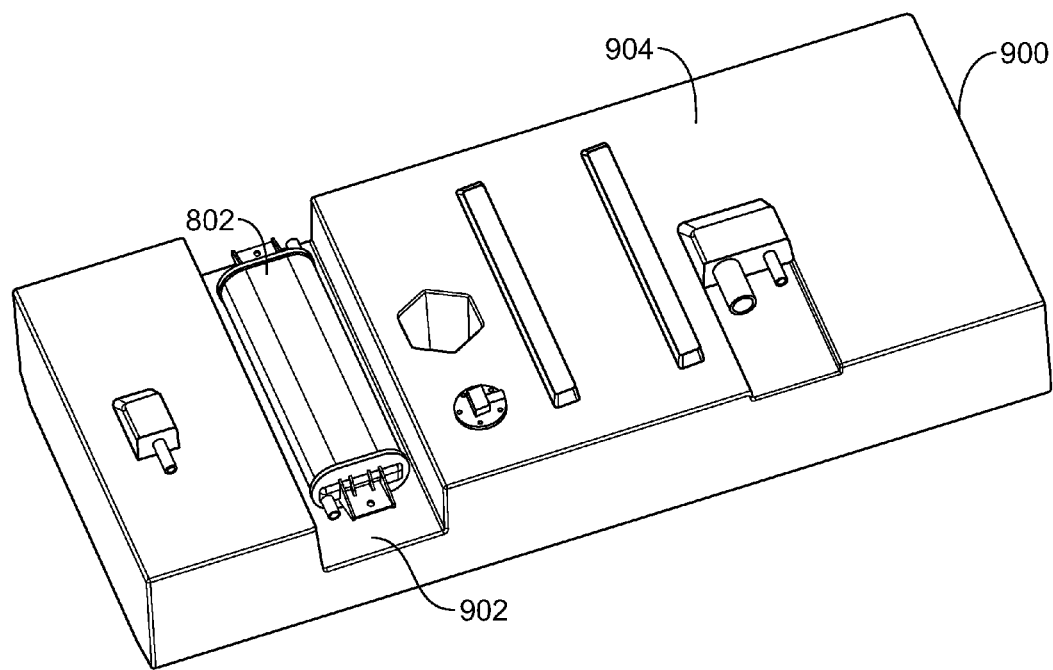
FIGS. 9A and 9B illustrate an example fuel tank that may be used to implement the example fuel delivery system of FIGS. 8A-8C.
Figure 9B:
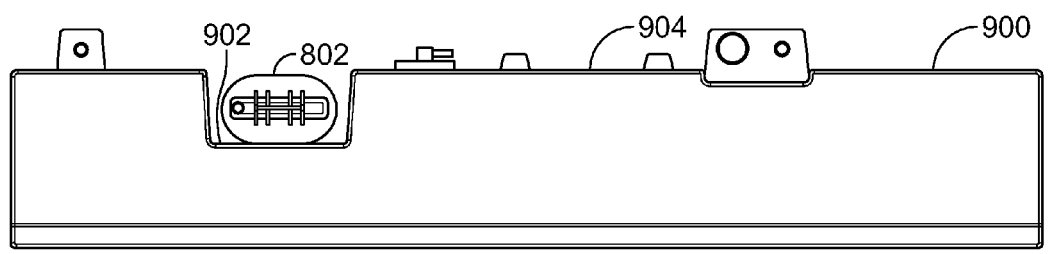

FIGS. 9A and 9B illustrate another example fuel tank 900 that can be used to implement the fuel delivery system 800 of FIGS. 8A-8C. The example fuel tank 900 includes a recessed portion or well 902 (e.g., integrally formed with the fuel tank 900) to receive the vapor collection apparatus 802. Additionally or alternatively, the recessed portion or well 902 may be dimensioned or sized (e.g., have a width) to receive the vapor collection apparatus 802 via interference or snap fit. The recessed portion 902 may be dimensioned or sized (e.g., have a depth) to enable the vapor collection apparatus 802 to be flush-mounted relative to a surface 904 of the fuel tank 900. The recessed portion 902 includes fasteners (e.g., the fasteners 822 of FIGS. 8A-8C) that may be integrally formed with the fuel tank 900 to couple the vapor collection apparatus 802 to the fuel tank 900 as described above in connection with FIGS. 8A-8C.

Figure 10:
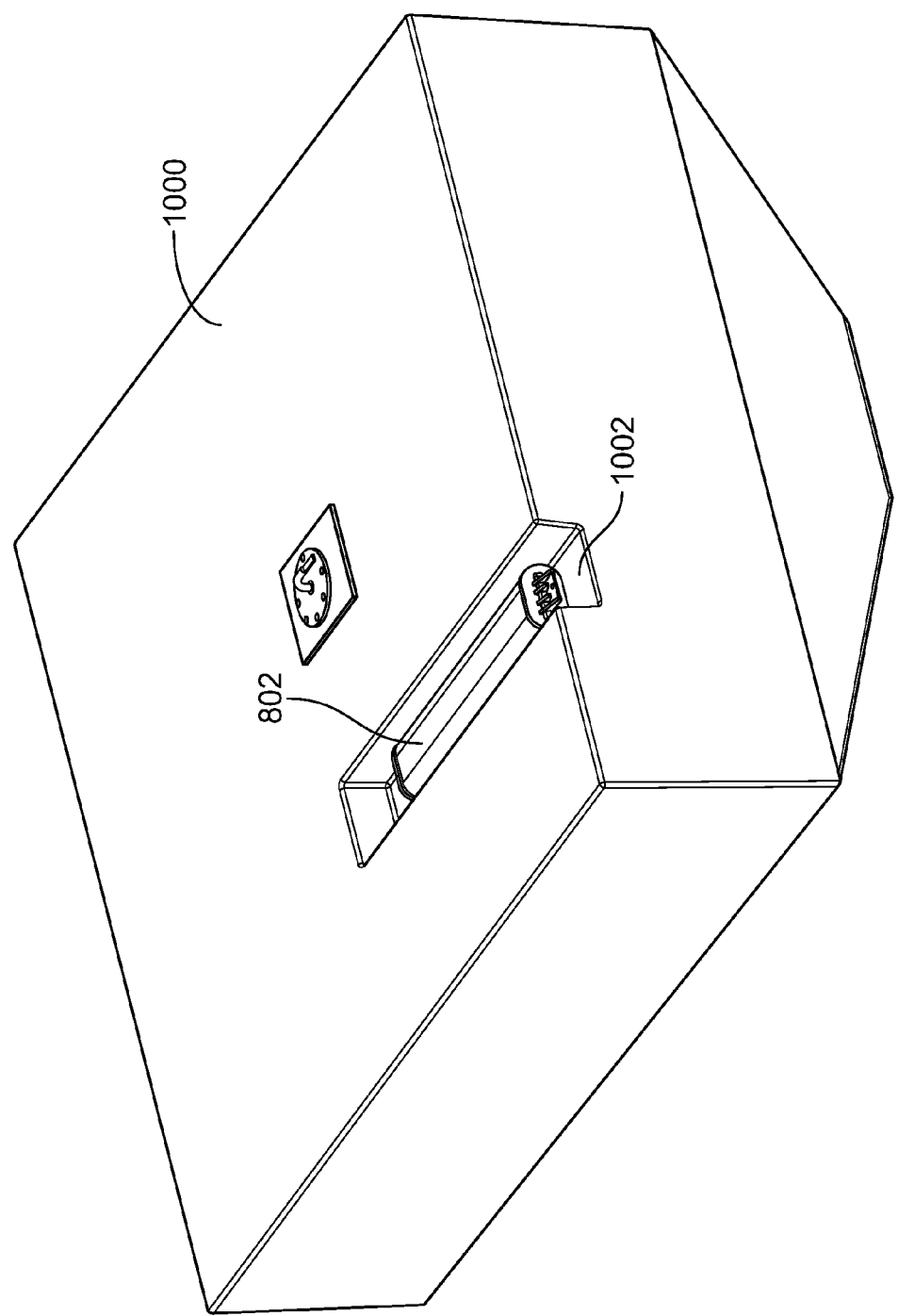
FIG. 10 illustrates yet another example fuel tank that may be used to implement the example fuel delivery system of FIGS. 8A-8C.

FIG. 10 illustrates yet another example fuel tank 1000 that may be used to implement the example fuel delivery system 800 of FIGS. 8A-8C. The example fuel tank 1000 of FIG. 10 includes a partial recessed portion 1002 to receive the vapor collection apparatus 802. The partial recessed portion 1002 reduces less volume of the fuel tank 1000 compared to the recessed portion 902 of FIGS. 9A and 9B and, thus, enables the fuel tank 1000 to receive more fuel.

In some examples, although not shown, the recessed portions 902 and/or 1002 may include tabs or clips (e.g., integrally formed with the recessed portions 902 and 1002 of the respective fuel tanks 900 and 1000) to enable the vapor collection apparatus 802 to couple to the fuel tanks 900 and 1000 via snap fit or interference fit. In some examples, the vapor collection apparatus 802 is coupled to the fuel tanks 900 and/or 1000 (e.g., within the respective recessed portion 902 and 1002) via a band or clamping mechanism. In yet other examples, the fuel tanks 804, 900 and/or 1000 may be implemented with the insert material 500 and a plastic fastener (e.g., a plastic stud, or internally threaded plastic boss, etc.) may be coupled to the fuel tanks 804, 900 and/or 1000 via the insert material 500 and the methods described above in connection with FIGS. 5, 6A-6J.

The example vapor collection apparatus 802 and the fuel tanks 804, 900 and 1000 facilitate mounting of the vapor collection apparatus 802. For example, known vapor collection apparatus are typically mounted to a marine craft at a remote location from a fuel tank. For example, in contrast to the vapor collection apparatus 122 of FIG. 1, the vapor collection apparatus 802 provides a compact dimensional envelope and/or decreases the overall dimensional footprint of a fuel delivery system implemented with the example fuel tanks 804, 900 and/or 1000. Additionally, such a configuration requires additional or shorter length tubing (e.g., the tubing 828), which may decrease fuel leakage to the environment via the tubing and/or tubing coupling.

The example fuel delivery systems described herein may be combined or provided as a unitary or single fuel delivery system. For example, the venting systems 208, 220 and/or 222 may be implemented with the fuel delivery system 400 of FIGS. 4A and 4B, the fuel delivery system 800, and/or any combination thereof. Additionally or alternatively, the fuel cap apparatus 218 of FIGS. 2A and 2B, the insert material 500 of FIGS. 5, 6A-6B, the fluid coupling 700 of FIGS. 7A-7C, the vapor collection apparatus 802 and the fuel tank 804 of FIGS. 8A-8C, the fuel tank 900 of FIGS. 9A and 9B, and/or the fuel tank 1000 of FIG. 10 may be used to implement the fuel delivery system 100 of FIG. 1, the fuel delivery system 200 of FIGS. 2A-2B, the fuel delivery system 400 of FIG. 4, and/or any other fuel delivery system(s).

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

We claim:

1. A fuel tank, comprising:
a housing having a cavity to store a liquid fuel;
a vapor collection apparatus; and
a boss integrally formed with a surface of the housing, the boss protruding from the surface and having an internally threaded opening to receive a threaded fastener, the vapor collection apparatus being coupled to the surface of the housing via the boss, the internally threaded opening being fluidly isolated from the cavity.

2. A fuel tank of claim 1, wherein the boss is integrally formed with the housing of the fuel tank via blow molding to enable the opening of the boss to be fluidly isolated from the cavity.

3. A fuel tank of claim 1, wherein the vapor collection apparatus comprises a canister disposed between ends having flanged portions.

4. A fuel tank of claim 3, wherein at least one of the flanged portions is to couple the vapor collection apparatus to the fuel tank via the boss.

5. A fuel tank of claim 1, wherein the surface of the housing includes a plurality of bosses integrally formed with the housing.

6. A fuel tank of claim 1, wherein the boss protrudes from an uppermost surface of the fuel tank.

7. A fuel tank, comprising:
a housing having a cavity to store a liquid fuel; and
a recessed portion integrally formed with a surface of the housing to receive a vapor collection apparatus, the recessed portion including a plurality of bosses integrally formed with the recessed portion, each of the plurality of bosses comprises an internally threaded boss, the plurality of bosses to inhibit fluid flow through a longitudinal axis of the bosses to isolate the cavity from an exterior of the housing.

8. A fuel tank of claim 7, wherein the bosses protrude from the recessed portion of the fuel tank.

9. A fuel tank of claim 7, wherein the bosses are integrally formed with the recessed portion via blow molding.

10. A fuel tank of claim 7, wherein the vapor collection apparatus is flush mounted relative to an uppermost surface of the housing when the vapor collection apparatus is positioned in the recessed portion.

11. A fuel tank comprising:
means for containing a fluid having at least one wall; and
means for mounting integrally formed with the means for containing the fluid, the means for mounting to at least partially protrude from the at least one wall of the means for containing the fluid, the means for mounting having means for threadably receiving a fastener, the means for mounting configured to inhibit a fluid flow path through a longitudinal axis of the means for mounting to isolate a cavity of the means for containing from an exterior of the means for containing; and
means for collecting fuel vapors, the means for collecting fuel vapors being directly attached to the wall via the means for mounting.

12. A fuel tank of claim 11, wherein the means for mounting further comprises means for flush mounting the means for collecting fuel vapors relative to an upper surface of the means for containing a fluid, the means for mounting projecting from the means for flush mounting.

13. The fuel tank of claim 1, wherein the boss directly attaches the vapor collection apparatus to the surface of the housing.

14. The fuel tank of claim 1, wherein the boss prevents fluid flow through a body of the boss.

15. The fuel tank of claim 1, wherein the boss prevents access to the cavity.

16. The fuel tank of claim 7, wherein the recess defines a U-shaped channel.

17. The fuel tank of claim 16, wherein the vapor collection apparatus is positioned within the U-shaped channel such that an upper surface of the vapor collection apparatus is substantially flush with an upper edge of each side wall of the U-shaped channel.

18. The fuel tank of claim 7, wherein the bosses receive fasteners to directly attach the vapor collection apparatus to the surface of the fuel tank.

* * * * *

UNITED STATES PATENT AND TRADEMARK OFFICE
CERTIFICATE OF CORRECTION

PATENT NO. : 8,833,346 B2
APPLICATION NO. : 12/793009
DATED : September 16, 2014
INVENTOR(S) : Sean Whelan et al.

Page 1 of 1

It is certified that error appears in the above-identified patent and that said Letters Patent is hereby corrected as shown below:

On the Title Page

Item (75) after "Inventors: Brian Scott," delete "Cornstock Park" and insert -- Comstock Park --.

Item (73) after "Assignee: Brunswick Corporation," delete "Lake Forrest" and insert -- Lake Forest --.

Signed and Sealed this
Thirtieth Day of December, 2014

Michelle K. Lee
*Deputy Director of the United States Patent and Trademark Office*